United States Patent
Nguyen et al.

(10) Patent No.: US 10,241,290 B2
(45) Date of Patent: Mar. 26, 2019

(54) OPTICAL POST MOUNT SYSTEM AND METHOD OF USE

(71) Applicant: NEWPORT CORPORATION, Irvine, CA (US)

(72) Inventors: Ken Nguyen, Santa Ana, CA (US); James Fisher, Tustin, CA (US); Rick Sebastian, Costa Mesa, CA (US)

(73) Assignee: NEWPORT CORPORATION, Irvine, CA (US)

( * ) Notice: Subject to any disclaimer, the term of this patent is extended or adjusted under 35 U.S.C. 154(b) by 17 days.

(21) Appl. No.: 15/601,971

(22) Filed: May 22, 2017

(65) Prior Publication Data

US 2017/0254977 A1    Sep. 7, 2017

Related U.S. Application Data

(63) Continuation of application No. 14/764,565, filed as application No. PCT/US2014/013880 on Jan. 30, 2014, now Pat. No. 9,678,300.
(Continued)

(51) Int. Cl.
*G02B 7/00*    (2006.01)
*G02B 6/42*    (2006.01)
(Continued)

(52) U.S. Cl.
CPC ............. *G02B 7/004* (2013.01); *F16M 11/04* (2013.01); *G01M 11/04* (2013.01);
(Continued)

(58) Field of Classification Search
CPC ...... G02B 7/003; G02B 7/004; G02B 7/1824; G02B 7/1825; G02B 6/4226;
(Continued)

(56) References Cited

U.S. PATENT DOCUMENTS 2,339,615 A * 1/1944 Castelli ................. F16B 7/1427
                                                                    403/342
3,044,740 A * 7/1962 Kilminster ........... G01B 5/0004
                                                                    248/124.2
(Continued)

FOREIGN PATENT DOCUMENTS

CN     201377663 Y    1/2010
CN     102900922 A    1/2013
(Continued)

OTHER PUBLICATIONS

International Search Report and Written Opinion dated May 20, 2014 in International Application No. PCT/US2014/013880 filed: Jan. 30, 2014 and published as: WO 2014/120939 on Aug. 7, 2014.
(Continued)

*Primary Examiner* — Eret C McNichols
(74) *Attorney, Agent, or Firm* — Schmeiser, Olsen & Watts LLP

(57) ABSTRACT

An optical mount system that may be adjusted by a variety of devices and methods. In some cases, a post collar assembly may be configured to engage a collar coupling surface of a post holder body such that the post collar engages the collar coupling surface in indexed and predetermined angular positions. In some cases, a base of a post holder body may be configured to accept a secondary base element in the form of a mounting adapter which may be releasably secured the base to provide additional stiffness for the mounting of the base to a reference surface.

13 Claims, 14 Drawing Sheets

Related U.S. Application Data

(60) Provisional application No. 61/759,539, filed on Feb. 1, 2013.

(51) Int. Cl.
  *G02B 7/182* (2006.01)
  *G01M 11/04* (2006.01)
  *G02B 26/10* (2006.01)
  *F16M 11/04* (2006.01)

(52) U.S. Cl.
  CPC ........... *G02B 6/4226* (2013.01); *G02B 7/003* (2013.01); *G02B 7/1824* (2013.01); *G02B 7/1825* (2013.01); *G02B 26/103* (2013.01)

(58) Field of Classification Search
  CPC ..... G02B 26/103; F16M 11/04; G01M 11/04; G01B 3/002; G01B 5/0004
  USPC ........................................................ 384/35
  See application file for complete search history.

(56) References Cited

U.S. PATENT DOCUMENTS

| | | |
|---|---|---|
| 3,357,268 A | 12/1967 | Richter |
| 3,840,284 A | 10/1974 | Rand |
| 4,576,501 A | 3/1986 | McConnell |
| 4,593,476 A * | 6/1986 | Clark .................... G01B 5/207 33/529 |
| 4,840,450 A | 6/1989 | Jones et al. |
| 4,865,424 A | 9/1989 | Zupanick et al. |
| 5,026,033 A * | 6/1991 | Roxy .................... B23Q 3/103 269/309 |
| 5,039,043 A * | 8/1991 | Hodge .................... B01L 9/00 248/125.8 |
| 5,140,470 A | 8/1992 | Luecke |
| 5,168,168 A | 12/1992 | Luecke |
| 5,419,522 A | 5/1995 | Luecke et al. |
| 5,513,048 A | 4/1996 | Chen |
| 5,597,149 A * | 1/1997 | Hodge .................... G01B 5/0004 248/231.41 |
| 5,852,519 A | 12/1998 | Do et al. |
| 6,305,869 B1 | 10/2001 | Chen |
| 6,334,594 B1 * | 1/2002 | Bailey .................... F16M 11/24 248/125.1 |
| 7,064,908 B2 | 6/2006 | Cipra |
| 7,400,802 B2 | 7/2008 | Wyatt et al. |
| 8,355,207 B2 | 1/2013 | Hunter et al. |
| 8,400,623 B2 | 3/2013 | Kasturi et al. |
| 8,651,447 B2 | 2/2014 | Ryaboy et al. |
| 9,678,300 B2 | 6/2017 | Nguyen et al. |
| 2001/0035479 A1 | 11/2001 | Roebuck |
| 2003/0116684 A1 | 6/2003 | Rotondi |
| 2006/0186284 A1 | 8/2006 | Root |
| 2007/0065086 A1 | 3/2007 | Wyatt et al. |
| 2009/0087251 A1 | 4/2009 | Chen |
| 2010/0237206 A1 | 9/2010 | Barker |
| 2012/0032038 A1 | 2/2012 | Ye |
| 2013/0001396 A1 | 1/2013 | Ryaboy et al. |
| 2013/0201572 A1 | 8/2013 | Yachi et al. |
| 2015/0362694 A1 | 12/2015 | Nguyen et al. |
| 2016/0187609 A1 | 6/2016 | Jin et al. |

FOREIGN PATENT DOCUMENTS

| | | | |
|---|---|---|---|
| DE | 3801813 A1 * | 8/1989 | ............. G01B 3/002 |
| JP | 58-106708 | 7/1983 | |
| JP | 59-27510 | 2/1984 | |
| JP | 5-38615 | 5/1993 | |
| KR | 2010/0080248 | 7/2010 | |
| WO | WO 99/035409 | 7/1999 | |
| WO | WO 14/120939 | 8/2014 | |
| WO | WO 15/187735 | 12/2015 | |

OTHER PUBLICATIONS

International Preliminary Report on Patentability dated Aug. 4, 2015 in International Application No. PCT/US2014/013880 filed: Jan. 30, 2014 and published as: WO 2014/120939 on Aug. 7, 2014.

Supplementary European Search Report dated Jun. 29, 2016 in European Application No. EP 14746636.1, filed: Jan. 30, 2014.

Notice of Allowance dated Feb. 13, 2017 in U.S. Appl. No. 14/764,565, filed Jul. 29, 2015, published as: US2015/0362694 on Dec. 17, 2015 and Issued as: 9,678,300 on Jun. 13, 2017.

Non-Final Office Action dated Aug. 25, 2016 in U.S. Appl. No. 14/764,565, filed Jul. 29, 2015, published as: US2015/0362694 on Dec. 17, 2015 and Issued as: 9,678,300 on Jun. 13, 2017.

* cited by examiner

OPTICAL POST MOUNT SYSTEM AND METHOD OF USE

RELATED PATENT APPLICATION(S)

This application is a continuation of U.S. patent application Ser. No. 14/764,565, filed Jul. 29, 2015, naming Ken Nguyen et al. as inventors, titled "Optical Post Mount System and Method of Use", which is a national stage application under 35 U.S.C. section 371 of International Patent Application No. PCT/US2014/013880, filed Jan. 30, 2014, naming Ken Nguyen et al. as inventors, titled "Optical Post Mount System and Method of Use", which claims priority from U.S. Provisional Patent Application No. 61/759,539, filed Feb. 1, 2013, naming Ken Nguyen et al. as inventors, and titled "Optical Post Mount System and Method of Use", each of which are incorporated by reference herein in their entirety.

BACKGROUND

Optical devices or elements such as lenses, mirrors, wave plates, filters, volume Bragg gratings, prisms, light sources, such as lasers, instruments including detectors and the like are often mounted in an optical system, and particularly an experimental optical system, with the use of one or more optical mount assemblies. An example of an optical system may include an optical bench including a flat planar work surface having multiple optical devices and components mounted to the work surface. In some cases, the optical devices may be mounted with an orientation so as to provide an optical path which directs a light beam from one optical device to the next. Beams from lasers or other light sources are generally used for such applications. Optical post mount assemblies may be used in order to secure the various optical devices to the work surface or other component of the optical system, with adjustability of the orientation of the various optical elements. For such an arrangement the optical elements may be secured to an optical mount, such as a lens holder, which is in turn secured to an optical post. The optical post may be secured to an optical post mount system, which is secured to the work surface or other component of an optical system.

A user of a typical optical system may adjust the position of an optical element by rotating and/or translating an optical post within a post receiver channel of an optical post mount system. The position of the optical element may also be varied by adjusting the position of a mounting base of the optical post mount system on a work surface of the optical bench. What have been needed are optical post mount systems and methods which allow for accurate and repeatable adjustment of the position of optical posts. What have also been needed are optical post mount systems and methods that allow for removal and replacement of optical posts and associated components while maintaining accurate positioning.

SUMMARY

Some embodiments of an optical mount assembly may include an optical post mount system. The optical post mount system may include a post holder body which has an upper end, a lower end, a post receiver, and a collar coupling surface disposed on the upper end of the post holder body. The collar coupling surface may include at least one positioning element. The optical mount assembly may also include a mounting base which is disposed at the lower end of the post holder body in fixed relation thereto. The optical mount assembly may also include a post collar which may have an upper side, a lower side, and a post aperture which extends from the upper side to the lower side. The post collar may also include a post lock device which is configured to secure the optical post relative to the post collar, and at least one collar positioning device disposed on the lower side of the post collar. The collar positioning device may be configured to engage the at least one positioning element of the post holder body and to prevent relative rotational movement about a longitudinal axis of the post aperture between the post collar and the post holder body when the positioning element and positioning device are engaged. The optical mount assembly may also include a rigid elongated optical post which is coupled to the post receiver of the post holder body and which is disposed within the post aperture of the post collar. The optical post may include an upper end and a lower end. The optical mount assembly may also include an optical mount which is secured to the upper end of the optical post.

Some embodiments of an optical mount assembly may include an optical post mount system which may include a post holder body having a rigid structure, an upper end, a lower end, and a post receiver. The optical mount assembly may also include a mounting base which is disposed at the lower end of the post holder body in fixed relation thereto. The mounting base may have a rigid structure, and may include a flat bottom surface and at least one adapter receiver disposed within the flat bottom surface. The optical mount assembly may also include a mounting adapter which may have a rigid structure, and which may include a flat bottom surface and a coupling extension which is configured to be detachably coupled to the adapter receiver. The flat bottom surface of the mounting adapter is configured such that it is parallel to the flat bottom surface of the mounting base. The optical mount assembly may also include a rigid elongate optical post which is operatively coupled with the post receiver of the post holder body. The optical post may also include an upper end and a lower end. The optical mount assembly may also include an optical mount which is secured to the upper end of the optical post.

Some embodiments of an optical post mount system may include a post holder body which may include an upper end, a lower end, a post receiver, and a collar coupling surface disposed on the upper end of the post holder body. The collar coupling surface may include at least one positioning element. The optical post mount system may also include a mounting base which is disposed at the lower end of the post holder body in fixed relation thereto. The optical post mount system may also include a post collar which may include an upper side, a lower side, a post aperture extending from the upper side to the lower side, and a post lock device. The post collar may also include at least one collar positioning device which is disposed on the lower side of the post collar, with the at least one collar positioning device being configured to engage the at least one positioning element of the post holder body and to prevent relative rotational movement about a longitudinal axis of the post aperture between the post collar and the post holder body when the positioning element and positioning device are engaged.

Some embodiments of an optical post mount system may include a post holder body having a rigid structure, an upper end, a lower end, and a post receiver. The optical post mount system may also include a mounting base which is disposed at the lower end of the post holder body in fixed relation thereto. The mounting base may include a rigid structure, a flat bottom surface and at least one adapter receiver disposed within the flat bottom surface. The optical post mount system may also include a mounting adapter having a rigid structure, a flat bottom surface and a coupling extension which is configured to be detachably coupled to the adapter receiver. The flat bottom surface of the mounting adapter may be configured such that it is parallel to the flat bottom surface of the mounting base.

Some embodiments of a method of adjusting an optical mount assembly may include providing an optical mount assembly. The optical mount assembly may include an optical post mount system. The optical post mount system may include a post holder body having an upper end, a lower end, a post receiver, and a collar coupling surface which is disposed on the upper end of the post holder body. The collar coupling surface may include at least one positioning element. The optical post mount system may also include a mounting base which is disposed at the lower end of the post holder body in fixed relation thereto. The optical post mount system may also include a post collar which may include an upper side, a lower side, a post aperture extending from the upper side to the lower side, a post lock device which is configured to secure an optical post relative to the post collar, and at least one collar positioning device disposed on the lower side of the post collar. The post collar may be engaged with the collar coupling surface such that at least one collar positioning device is engaged with at least one positioning element so as to prevent relative rotational movement about a longitudinal axis of the post aperture between the post collar and the post holder body. The optical mount assembly may also include a rigid elongate optical post which is moveably coupled to the post receiver of the post holder body and which is secured within the post aperture of the post collar by the post lock device. The optical post may include an upper end and a lower end. The optical mount assembly may also include an optical mount which is secured to an upper end of the optical post. The method of adjusting an optical mount assembly may also include displacing the post collar and the optical post so as to disengage the post collar from the collar coupling surface such that the at least one collar positioning device is disengaged from the at least one positioning element and no longer prevents relative rotational movement about a longitudinal axis of the post aperture between the post collar and the post holder body. The method of adjusting an optical mount assembly may also include re-engaging the post collar so as to engage the post collar with the collar coupling surface such that at least one collar positioning device is engaged with at least one positioning element so as to prevent relative rotational movement about a longitudinal axis of the post aperture between the post collar, the optical post, and the post holder body.

Some embodiments of a method for replacing an optical mount of an optical mount assembly may include providing an optical mount assembly. The optical mount assembly may include an optical post mount system. The optical post mount system may include a post holder body having an upper end, a lower end, a post receiver, and a collar coupling surface which is disposed on the upper end of the post holder body. The collar coupling surface may include at least one positioning element. The optical post mount system may also include a mounting base which is disposed at the lower end of the post holder body in fixed relation thereto. The optical post mount system may also include a first post collar including an upper side, a lower side, a post aperture extending from the upper side to the lower side, a post lock device which is configured to secure an optical post relative to the post collar, and at least one collar positioning device disposed on the lower side of the post collar. The first post collar may be engaged with the collar coupling surface such that at least one collar positioning device is engaged with at least one positioning element so as to prevent relative rotational movement about a longitudinal axis of the post aperture between the first post collar and the post holder body. The optical mount assembly may also include a first rigid elongate optical post which is moveably coupled to the post receiver of the post holder body and secured within the post aperture of the first post collar by the post lock device. The first optical post may include an upper end and a lower end. The optical mount assembly may also include a first optical mount which is secured to an upper end of the optical post. The method for replacing an optical mount of an optical mount assembly may also include removing the first post collar, the first optical post and the first optical mount so as to disengage the first post collar from the collar coupling surface such that the at least one collar positioning device is disengaged from the at least one positioning element and no longer prevents relative rotational movement about a longitudinal axis of the post aperture between the post collar and the post holder body. The method for replacing an optical mount of an optical mount assembly may also include replacing the first post collar, first optical post and first optical mount with a second post collar, second optical post and second optical mount such that the second post collar engages the collar coupling surface such that at least one collar positioning device of the second post collar is engaged with at least one positioning element of the collar coupling surface so as to prevent relative rotational movement about a longitudinal axis of the post aperture between the second post collar, the second optical post, the second optical mount and the post holder.

Some embodiments of a method for installing an optical post mount system may include providing an optical post mount system. The optical post mount system may include a post holder body having a rigid structure, an upper end, a lower end, and a post receiver. The optical post mount system may also include a mounting base which is disposed at the lower end of the post holder body in fixed relation thereto, the mounting base having a rigid structure, a flat bottom surface and at least one adapter receiver disposed within the flat bottom surface. The optical post mount system may also include a mounting adapter having a rigid structure, a flat bottom surface and a coupling extension which is configured to be detachably coupled to the adapter receiver. The flat bottom surface of the mounting adapter may be configured such that it is parallel to the flat bottom surface of the mounting base. The method for installing an optical post mount system may also include coupling the coupling extension of the mounting adapter to the adapter receiver of the mounting base and securing the coupling extension to the adapter receiver of the mounting base.

Some embodiments of an optical post holder system may include a post holder comprising a holder body having a post receiver therein. The optical post holder system may also include a mounting base which is in communication with the holder body. The mounting base having at least one adapter receiver disposed within it. The optical post holder system may also include a mounting adapter which is configured to be detachably coupled to the mounting base. The optical post holder system may also include a coupling surface which is formed on the holder body, with the coupling surface having one or more post positioning elements disposed on it. The optical post holder system may also include a post collar which is configured to be detachably coupled to an optical post, with the post collar comprising a collar body defining one or more collar positioning devices configured to engage the positioning element formed on the coupling surface.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

The drawings illustrate embodiments of the technology and are not limiting. For clarity and ease of illustration, the drawings may not be made to scale and, in some instances, various aspects may be shown exaggerated or enlarged to facilitate an understanding of particular embodiments.

DETAILED DESCRIPTION

Figure 1:
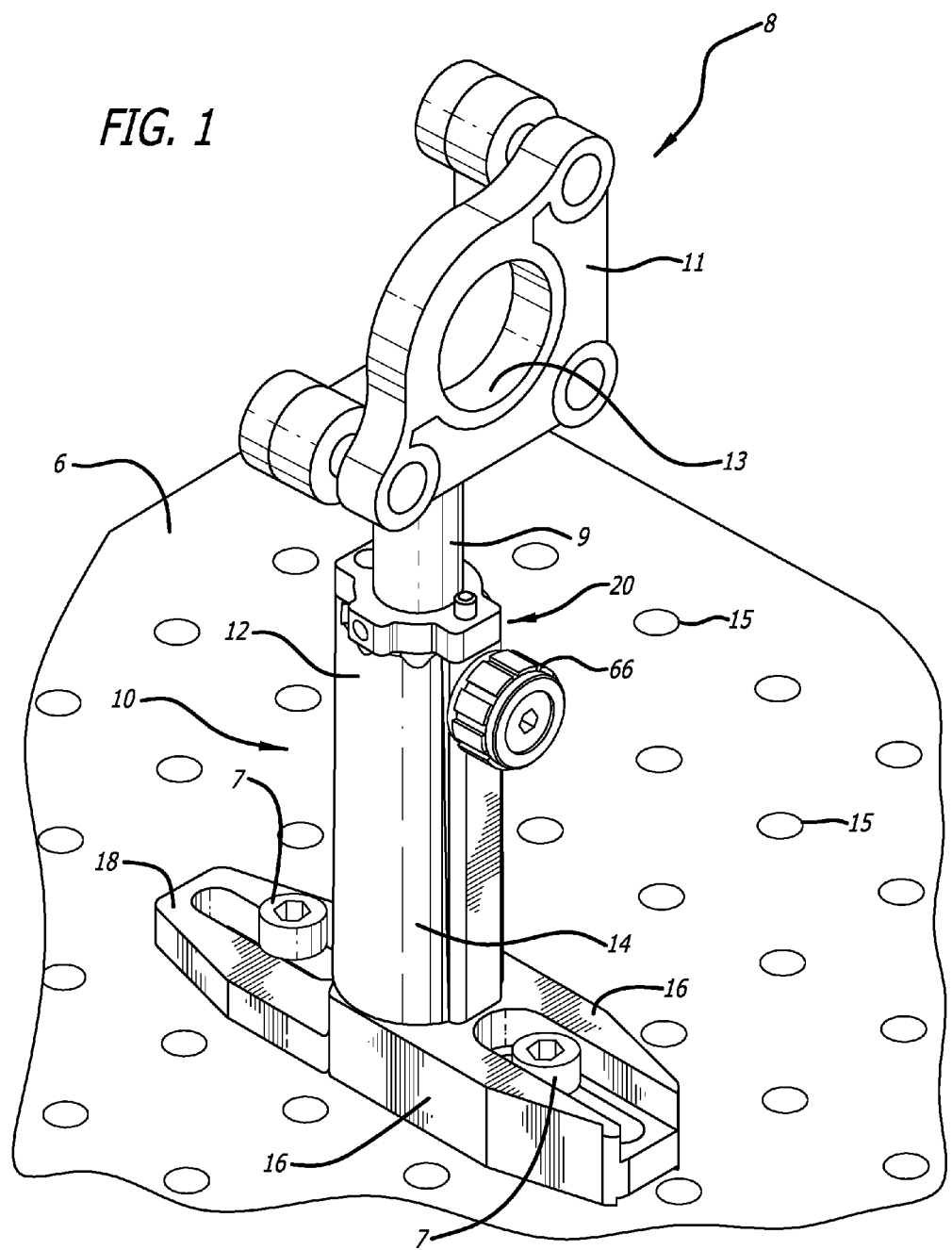
FIG. 1 is a perspective view of an optical mount secured to an optical mount assembly which is in turn secured to a work surface.

As discussed above, optical devices or elements such as lenses, mirrors, wave plates, filters, volume Bragg gratings, prisms, light sources, such as lasers, instruments including detectors and the like are often mounted in an optical system with the use of one or more optical post mount assemblies. Some optical post mount system embodiments may include a post holder secured to a mounting base. An optical post may be disposed within a post receiver channel of the post holder. The post receiver channel may be configured to be disposed in operative communication with a variety of optical posts, which may in turn be coupled to any suitable optical mounts for the mounting of various optical element(s). The post receiver channel may be configured such that it allows for the rotation of the optical post within the post receiver channel and allows for the axial translation of the optical post into or out of the post receiver channel. The post mount holder assembly may also include a position locking device such as a set screw which can be operatively coupled to the post holder body. Manipulation of the position locking device may be used to prevent rotation and/or translation of the optical post relative to the optical post mount system thereby locking the position of the optical post within the post receiver channel. The mounting base may include a fastener orifice which is configured to allow for the fastening of the mounting base to a work surface of an optical bench with a suitable fastener.

A user of such an optical system may adjust the position of an optical element by rotating and/or translating an optical post within a post receiver channel of an optical post mount system. The position of the optical element may also be varied by adjusting the position of a mounting base of the optical post mount system on a work surface of the optical bench.

Many optical systems are arranged using a grid system along linear arrays of holes which may include threaded holes which may be disposed on a flat planar work surface of an optical bench. For some optical benches, the reference surface may be covered with threaded holes in a predetermined pattern, such as a grid on one inch centers. Additionally, many of the optical elements of an optical system are configured to interact with each other at given fixed angles such as 30°, 45°, 90°, 180° or other suitable angles when they are arranged on an optical bench.

In some instances, it may be desirable for a user to be able to temporarily remove an optical post and optical mount attached thereto while leaving the optical post mount system in place and thereafter replace the optical post and optical mount to the same position with the optical element secured to the optical mount maintaining its same functional position. In some cases, it may also be desirable to adjust the angular orientation of an optical post within an optical post mount system by a predetermined angular displacement in an accurate and repeatable manner. It may also be desirable to replace a first optical post and optical mount with one or more alternative optical post and optical mount combinations in order to interchange optical elements such as lenses, filters, detectors, light sources etc. while maintaining control over the repeatable positioning of the interchanges elements.

Figure 2:
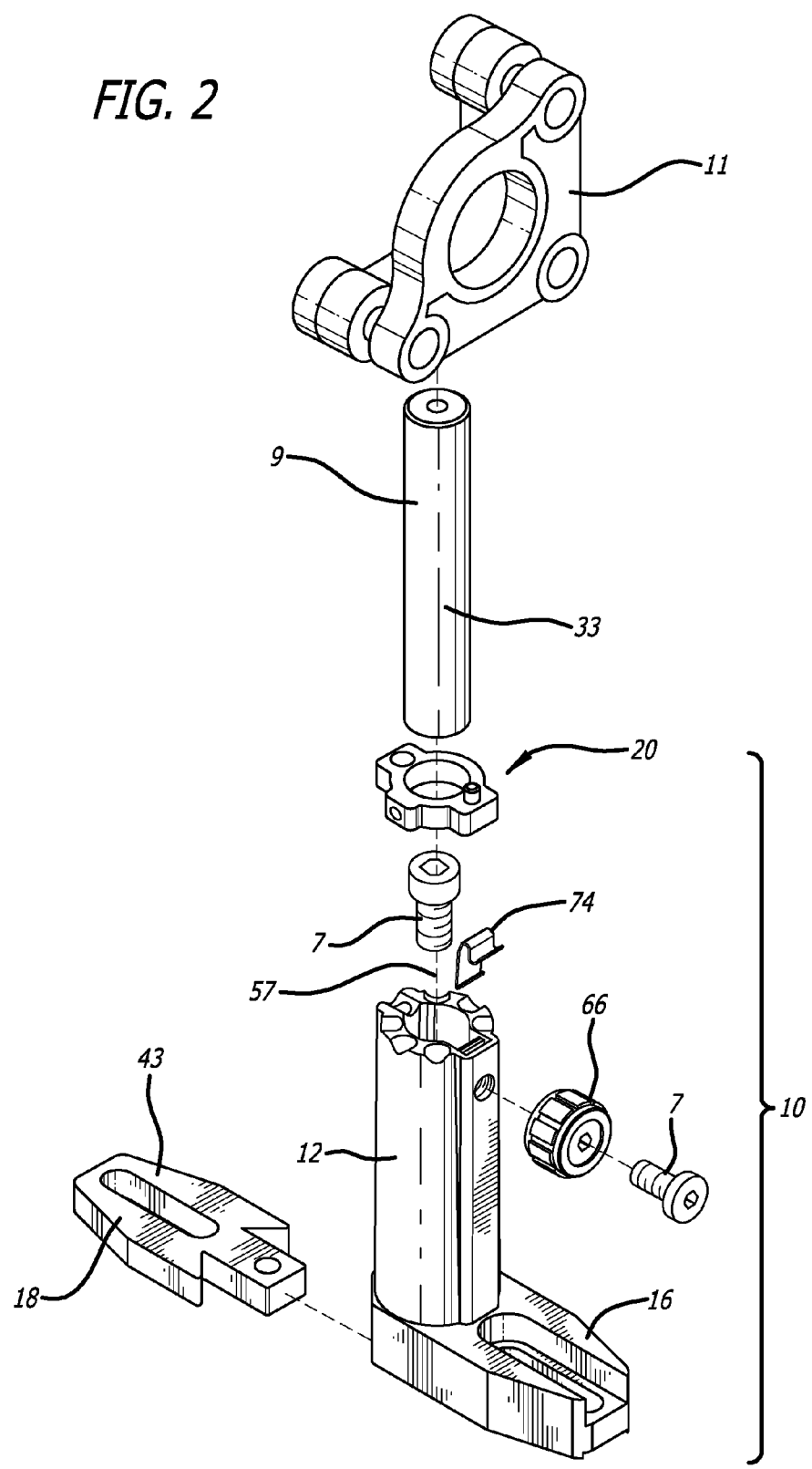
FIG. 2 is a perspective view of the optical mount assembly of FIG. 1 in an exploded perspective view showing the various elements of the optical mount assembly including a post mount holder, a mounting base, a mounting adapter, a post collar, and an optical post.
Figure 3:
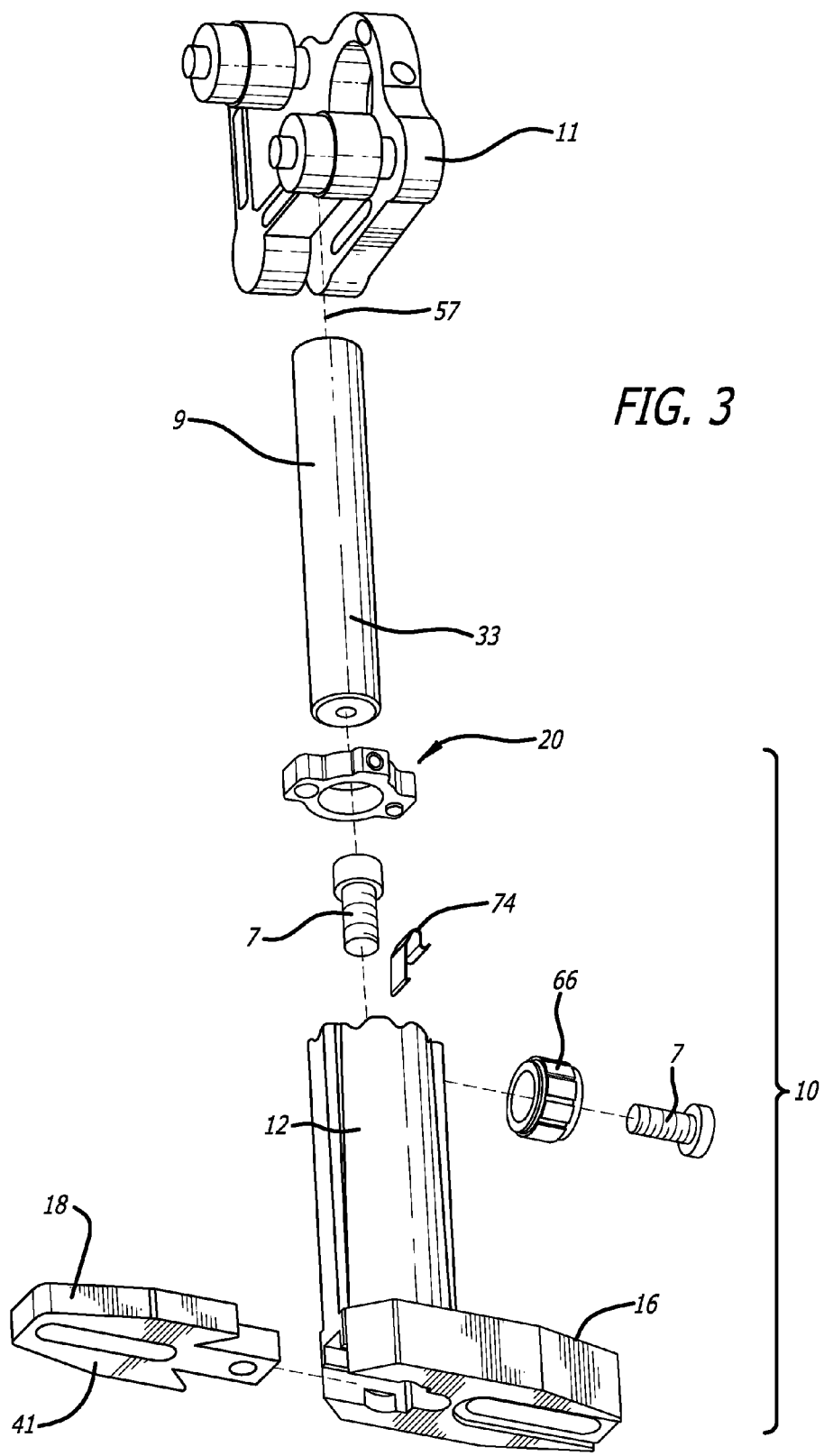
FIG. 3 is a perspective view of the optical mount of FIG. 1.

An embodiment of an optical mount assembly 8 which may include an optical post 9 which is coupled to an optical mount 11 is shown in FIGS. 1-3. The optical mount assembly may be secured to a work surface 6 by at least one fastener 7 which may be secured to at least one work surface hole 15 as is shown in FIG. 1. The work surface 7 may include an ordered array of work surface holes 15 which may include threaded holes, such as ¼ inch holes with about 20 threads per inch. FIGS. 1-3 also show various views of an optical post mount system embodiment 10 which may couple with the optical post 9 and which is useful in positioning and supporting one or more optical components which may be secured to the optical mount 11. The optical components may be secured to the optical mount within an optical device receptacle 13 which is disposed within the optical mount 11. As shown, the optical post mount system 10 may include a post holder 12 comprising at least one post holder body 14 and at least one mounting base 16 coupled to the post holder body 14. The mounting base 16 and post holder body 14 shown are integrally formed in a monolithic cast structure of continuous uninterrupted material. However, any suitable structure wherein the mountain base 16 and post holder body 14 are disposed in fixed relation to each other may be used. At least one post collar assembly 20 may be positioned proximate to the post holder body 14. The optical post mount system 10 may also include a mounting adapter 18 which may be suitably coupled to the post holder body 14. The mounting adapter 18 may act to provide additional stability to the optical mount assembly 8 when the mounting adapter 18 is coupled to the optical post mount system 10.

The optical post 9 may be releasably secured to the post collar assembly 20 which may include a post collar 20. With the optical mount assembly 8 secured to the work surface 6, the post collar assembly 20 may be repositioned on the post holder 12 thereby altering the angular position of the optical post 9, the optical mount 11, and any optical component which is disposed within the optical device receptacle 13. In some cases the post collar assembly 20 and the post holder 12 may be configured such that post collar assembly 20 may be adjusted to predetermined angular positions when it is coupled to the post holder 20. This in turn allows for the adjustment of the optical mount 11 (which is coupled to the post collar assembly by the optical post 9) to the corresponding predetermined angular positions to the post collar assembly 20 on the post holder 12. As discussed above, the post holder 12 may be configured such that it couples with the post collar assembly 20 at predetermined angular positions.

Figure 4:
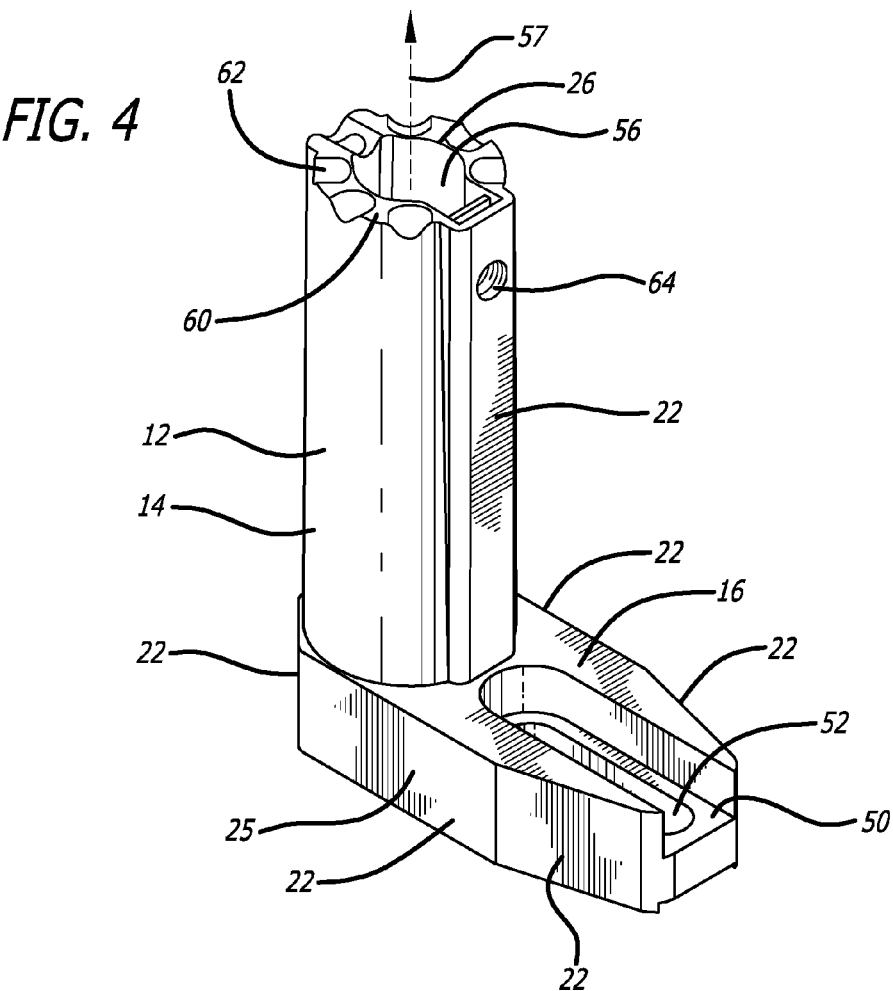
FIG. 4 is a perspective view of a post holder showing a collar coupling surface, a plurality of alignment faces, a post receiver, and a plurality of positioning elements.
Figure 5:
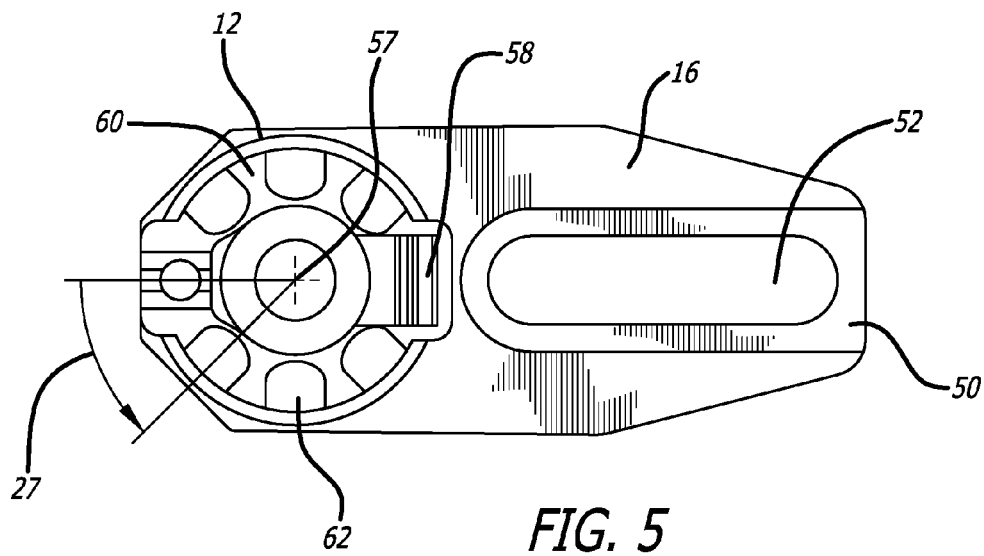
FIG. 5 is a top view of the post holder of FIG. 4 showing a positioner receiver, a fastener orifice, a fastener recess, and a plurality of positioning elements.
Figure 6:
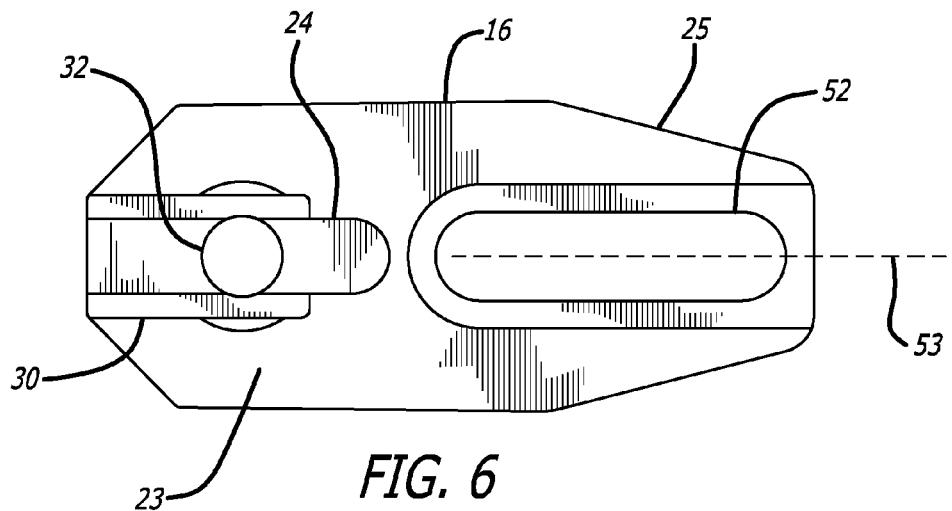
FIG. 6 is a bottom view of the post holder of FIG. 4 showing the fastener orifice, a mounting adapter receiver, a positioner receiver, and a fastener recess.
Figure 7:
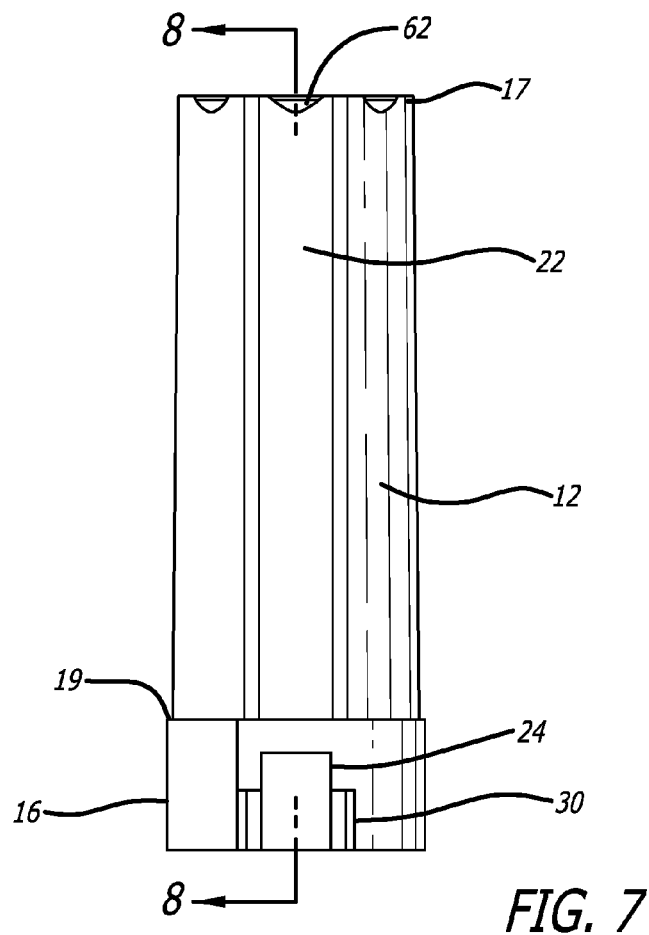
FIG. 7 is an elevation view of the post holder of FIG. 4 showing the mounting adapter receiver, an alignment face, and an alignment slot.
Figure 8:
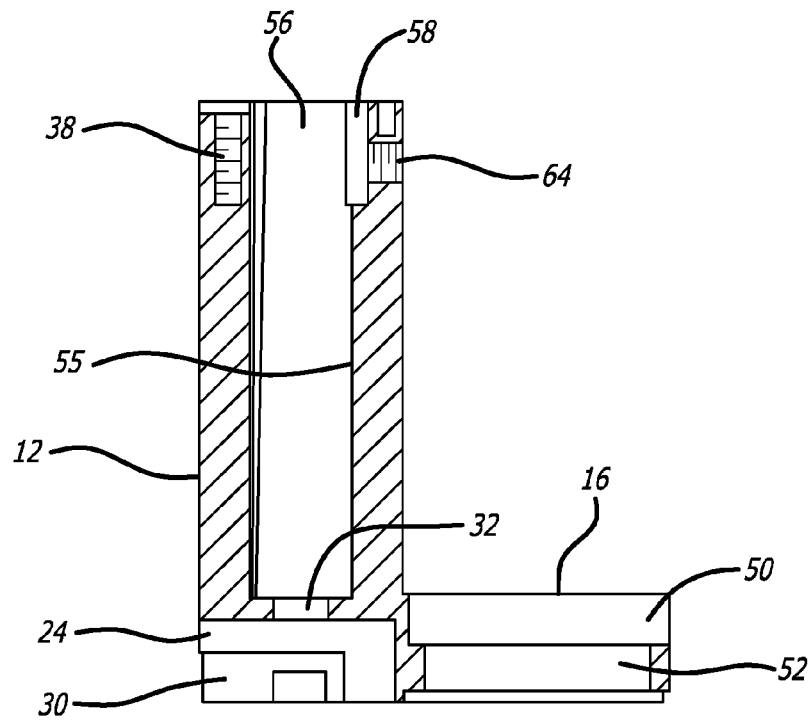
FIG. 8 is an elevation view in section of the post holder of FIG. 4 showing a threaded orifice, the post receiver, the mounting adapter receiver, the alignment slot, and a biasing member receiver.
Figure 9:
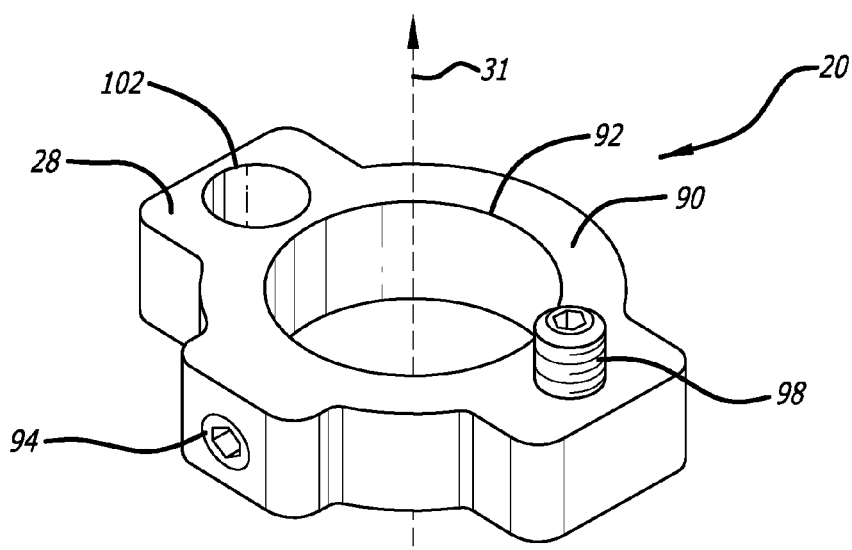
FIG. 9 is a perspective view of a post collar assembly including a post lock device, a post aperture, a fine adjustment device, a post collar, and a collar positioning passage.
Figure 10:
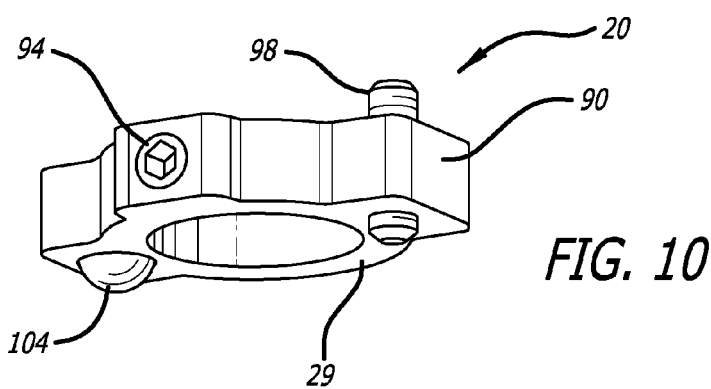
FIG. 10 is a perspective view of the post collar assembly of FIG. 9 showing a collar positioning device.
Figure 11:
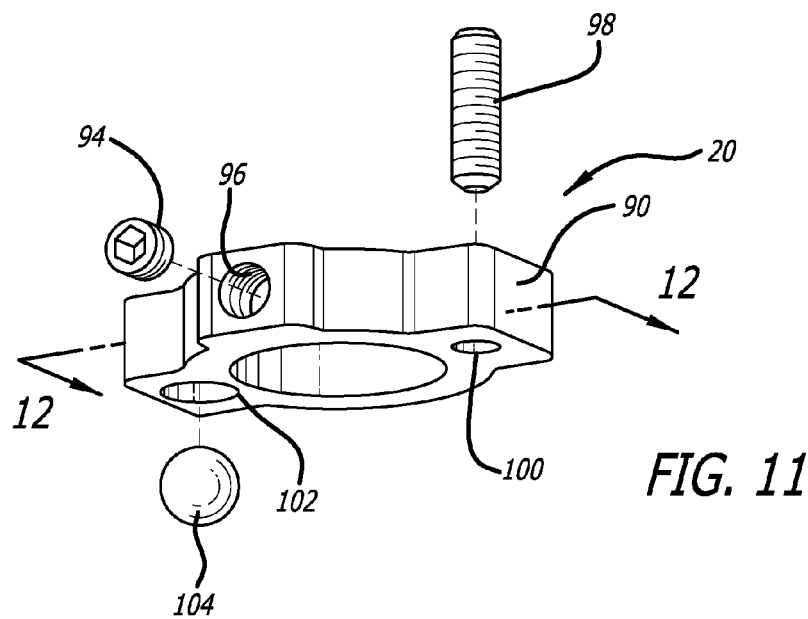
FIG. 11 is an exploded perspective view of the post collar assembly of FIG. 9 showing the post collar device, the collar positioning device, an adjustment device passage, the fine adjustment device, a lock aperture, and the post collar.
Figure 12:
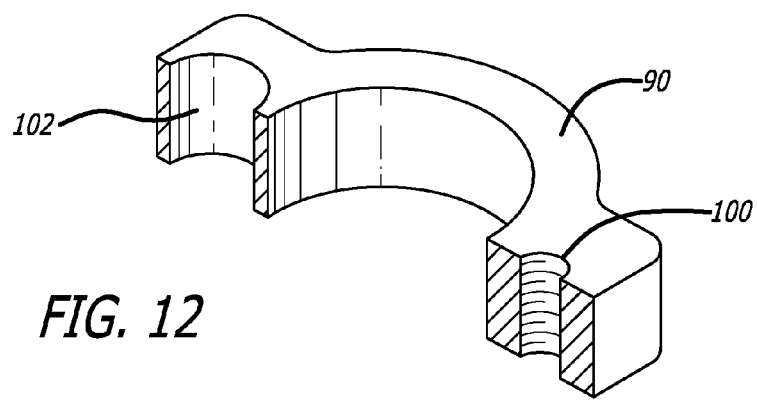
FIG. 12 is a perspective view in section of the post collar of FIG. 9 showing the collar positioning passage and the adjustment device passage.

Additional views of post holder 12 are shown in FIGS. 4-8. The holder body 14 may include a substantially cylindrical body which may have an axial length of about 5 cm to about 50 cm for some embodiments. The post holder body 14 may be fabricated from any suitable rigid high strength material such as aluminum, steel, including stainless steel, titanium, polymers, composite materials and the like. Those skilled in the art will appreciate that the holder body 14 may be manufactured in any variety of shapes. For example, the holder body 14 may be conically shaped. More specifically, the holder body 14 may have a greater diameter or transverse dimension proximate to the mounting base 16 as compared to the diameter of the holder body 14 proximate the post collar 20. As shown in FIGS. 4 and 7, one or more alignment faces or elements 22 may be formed on or otherwise disposed on at least one of the holder body 14, mounting base 16, and/or collar 20. In the illustrated embodiment, the alignment elements 22 comprise planar faces formed on the holder body 14 wherein the alignment faces 22 are substantially perpendicular to a work surface, such as work surface 6 shown in FIG. 1, supporting the novel post holder system 10. As such, the alignment faces 22 are configured to allow the user to quickly and easily align (rotationally, angularly, and/or linearly) the post holder system 10 relative to a neighboring optical element or device. In some embodiments, the alignment faces 22 may be include one or more alignment targets (not shown) positioned thereon.

The post holder 12 may also include a post receiver 56 which is disposed within the post holder body 14. The post receiver 56 may be configured as an elongated cylindrical bore which in some cases has a substantially uniform transverse dimension along its axial length, with the elongated cylindrical bore defining a post holder longitudinal axis 57 as shown in FIGS. 4 and 5. In some embodiments, the elongated cylindrical bore 57 may have an axial length of about 5 cm to about 40 cm, and the elongated cylindrical bore 57 may have a transverse dimension of about 5 mm to about 50 mm. In the illustrated embodiment the post receiver 56 comprises a substantially circular passage sized to receive at least one optical post 9 therein. Those skilled in the art will appreciate that the post receiver 56 may be formed in a variety of shapes and sizes as desired that may also be configured to confine the movement of an optical post 9 disposed therein to axial displacement along a longitudinal axis 57 of the optical post 9 and angular rotation about the longitudinal axis 57 of the optical post 9.

The post holder body 14 may include an upper end 17 and a lower end 19. The upper end 17 of the post holder 12 may include a collar coupling surface 60 which may be substantially perpendicular to the post holder longitudinal axis 57. The post holder 12 may also include an auxiliary mount hole 38 which in some instances may include a threaded hole (such as a ¼ inch hole with 20 threads per inch) that extends from the collar coupling surface 60 parallel to the post holder longitudinal axis 57 and into the post holder body 14. The auxiliary mount hole 38 may be used in some cases to mount an optical mount or the like directly to the coupling surface 60 of the post holder 14 without the use of an optical post 9. The post holder 12 may also include a biasing member receiver 58 which is disposed proximate to the post receiver 56 and which extends parallel to the post holder longitudinal axis 57 into the post holder body 14. The post holder body may also include a lock device recess 64 which may be configured as a threaded hole which is disposed substantially perpendicular to the post holder longitudinal axis 57 and which extends through both the biasing member receiver 58 and an inner surface 55 of the post receiver 56.

The post holder 12 may include the mounting base 16 disposed at the lower end 19 of the post holder body 14. For some embodiments, the mounting base 16 may be detachably coupled in fixed relation to the lower end 19 of the post holder body 14. In some cases, the mounting base 16 may be formed from any suitable rigid high strength material such as aluminum, titanium, steel, composite materials or the like. For some embodiments the mounting base 16 and post holder body 14 may be integrally and monolithically formed or cast from any suitable continuous and uninterrupted material such as aluminum, steel, including stainless steel, titanium, polymers, composite materials or the like. The integral monolithic configuration may serve to reduce the number of components of the topical post mount system 10 and may also serve to add rigidity and stability to the post mount system 10. The mounting base 16 may have a flat bottom surface 23 which is shown in FIG. 6, and an adapter receiver 30 which is configured as an elongated open slot in the flat bottom 23 surface of the mounting base 16 and which is disposed such that it is substantially perpendicular to the longitudinal axis 57. The mounting base 16 may also include a positioner receiver hole 32 which is disposed in communication between the elongate bore of the post receiver 56 and the adapter receiver 30. The positioner receiver hole 32 may be configured as a substantially cylindrical hole with a longitudinal axis that is substantially concentric and parallel to the post receiver longitudinal axis 57. The mounting base 16 may also include an alignment slot 24 which is adjacent the adapter receiver 30, and which may extend substantially parallel to the adapter receiver in a direction which is substantially perpendicular to the longitudinal axis 57. The mounting base 16 may also include a fastener orifice 52 which may be configured as an elongated slot which is substantially perpendicular to the bottom surface 23 of the mounting base 16 and which extends radially from the post holder longitudinal axis 57. A fastener recess 50 may be formed into the mounting base 16 on the bottom surface 23 of the mounting base 16 adjacent to and extending slightly from the fastener orifice 52. The fastener recess 50 may be configured as a recess area of reduced cross section material which is proximate the fastener orifice 52.

As discussed above, the post holder 12 may incorporate a plurality of alignment faces 22 which allow the user to quickly and easily align (rotationally, angularly, and/or linearly) the optical mount assembly 8 relative to a neighboring optical element or device. The mounting base 16 may also incorporate a plurality of alignment faces 22 for that same purpose. As shown in FIGS. 4-7, the alignment faces 22 may be configured as flat surfaces which are disposed on an outside lateral surface 25 of the mounting base 16. Each alignment face 22 may be perpendicular to the flat bottom surface 23 of the mounting base 16. Each alignment surface or face 22 may also be disposed at a predetermined angle with respect to a longitudinal axis 53 of the elongate slot of the fastener orifice 52. The alignment surfaces 22 may be configured such that the predetermined angles which they form with respect to the longitudinal axis 53 of the elongate slot 52 may be 30 degrees, 45 degrees, 90 degrees, or any other suitable predetermined angle.

The post holder body 14 may also include the collar coupling surface 60 which may be disposed on the upper end 17 of the post holder 12 as shown in FIG. 4. The collar coupling surface 60 is disposed about the post receiver 56 and may be configured such that it includes a plurality of positioning elements 62 which are disposed around a circumference 26 of the collar coupling surface 60 at predetermined angular positions relative to each other or relative to some other suitable reference point such as the axis 53 of the elongate slot of the fastener orifice 52. Exemplary positioning reliefs 62 include, without limitation, v-grooves, detents, orifices, lines, bumps, extensions, and the like. For example, in one embodiment, the positioning elements 62 comprise one or more v-groove type indentations formed on the coupling surface 60 sized to receive one or more collar positioning devices 104 formed on the post collar assembly 20 therein. FIG. 5 depicts an angular dimension 27 of separation between adjacent positioning elements 62 which may represent a common angular displacement between two predetermined angular positions of the positioning elements 62 about an axis such as the longitudinal axis 57 of the post receiver 56. For some embodiments, the coupling surface 60 may include any suitable number of positioning elements 62 including 1, 2, 3, 4, 5, 6, 7, 8, 9, 10, 11, 12 or more positioning elements 62. For some embodiments, the common angular displacement between adjacent positioning elements 62 may be any suitable angle up to 180°. For some embodiments, the common angular displacement between adjacent positioning elements 62 may be 30 degrees, 45 degrees, 90 degrees, or any other suitable common angular displacement. The collar coupling surface 60 of the post holder 12 may thus be configured to couple to the post collar assembly 20 at predetermined angular positions with respect to rotation about the longitudinal axis 57. Similarly, the post collar assembly 20 may be configured such that it couples with collar coupling surface 60 of the post holder 12 at predetermined angular positions.

In some embodiments of the post holder 12, the positioning elements 62 may include one or more lumens formed on the coupling surface 60, the lumens being sized to receive one or more collar positioning devices 104 formed on the post collar 20 therein. In some embodiments, the positioning elements 62 may include threaded orifices configured to receive at least one threaded device therein. For example, at least on threaded member (not shown) may be coupled to the holder body 14 via the threaded orifice 38 disposed at the post positioning relief 62. Thereafter, one or more optical mounts 11 may be coupled to the threaded member, thereby coupling the optical mount to the holder body 14 without requiring the use of an optical post. Optionally, the collar coupling surface 60 may be manufactured without the positioning reliefs 62 formed thereon. In some embodiments, the positioning reliefs 62 are integral to or formed on the collar coupling surface 60. In some embodiments, the positioning reliefs or elements 62 may comprise a detachable device or element configured to be positioned on and detachably coupled to the collar coupling surface 60. As discussed above, embodiments of the positioning reliefs 62 may be configured as any suitable surface that can mechanically capture or otherwise engage a corresponding element of the post collar including a detent, lumen, threaded hole or the like. These types of structures may form a semi-enclosed surface which can couple to or otherwise mechanically engage and at least partially mechanically capture a collar positioning device, such as collar positioning device 104. For those embodiments of the positioning elements 62 that form some type of cavity, the cavity may be considered to have an inner surface that mechanically engages an outer surface of a protrusion of the collar positioning element such as the semi-spherical surface of the collar positioning element embodiment 104 as shown. Other configurations of protrusion elements may also be used with the same result including cylindrical protrusions, rectangular protrusions, etc.

An embodiment of the post collar assembly 20 which is configured for use with the post holder 12 is shown in more detail in FIGS. 9-12. The post collar assembly 20 may include a post collar 20, a fine adjustment device 98, a post lock device 94, and the collar positioning device 104. As shown, the post collar 20 may include a collar body 90 defining at least one post aperture 92 sized to receive one or more optical posts of a suitable and corresponding diameter therein. The post aperture 92 may include a cylindrical bore that extends from an upper side 28 of the collar body to a lower side 29 of the collar body, with the post aperture 92 defining a post aperture axis 31. In the illustrated embodiment, the collar body 90 comprises a rigid monolithic body. Optionally, multiple collar body elements may be used to form the collar body 90. As such, the collar body 90 may comprise a split body device. Further, the collar body 90 may include at least one post lock device 94 positioned within one or more lock device apertures 96 formed on the collar body 90. The lock device aperture 96 may be disposed within the collar body 90 such that it is substantially perpendicular to the post aperture axis. In some embodiments, the lock device aperture 96 comprises a threaded passage configured to engage a threaded post lock device 94, such as a set screw in some cases, therein. As such, the user may position the post collar 20 on an optical post 9 at a desired position and actuate the lock device 94 to ensure the optical post remains at a desired height relative to the post holder 14. The post collar assembly 20 may also include a fine adjustment device 98 which is disposed within an adjustment device passage 100. The adjustment device passage 100 includes an axis which is substantially parallel to the post aperture axis 31. For some embodiments, the fine adjustment device 98 may be configured as a threaded shaft which is threadedly engaged with a threaded adjustment device passage 100 of the post collar body 90. The threaded shaft may have a length sufficient to extend below a lower surface of the collar body 90 and contact the coupling surface 60 of the post holder body 14, by rotating the threaded shaft can be carefully and accurately extended or retracted from the lower surface of the collar body 90 while in contact with the coupling surface 60. As such, the fine adjustment device 98 can be used to accurately adjust the axial separation between the lower surface of the collar body 90 and the coupling surface 60 of the post holder body 14.

As discussed above, the post collar assembly 20 may include at least one fine adjustment device 98 positioned within an adjustment device passage 100 formed in the collar body 90. In one embodiment, the fine adjustment device 98 and adjustment device passage 100 comprise threaded members configured to permit the user to actuate the fine adjustment device 98 to effect minute changes in the height of the post collar 20 relative to the holder body 14. Collar body embodiments 90 may also include at least one collar positioning passage 102 sized to receive one or more collar positioning devices 104 therein. As discussed above, the collar positioning device 104 may be configured to engage the post positioning relief elements 62 formed on the coupling surface 60 of the holder body 14, thereby permitting a user to securely and repeatably position the optical mount 11 supported by the optical post holder system 10 in a rotational orientation. In the illustrated embodiment, the collar positioning device 104 includes a rigid spherical positioning device. Optionally, the collar positioning device 104 may comprise any variety of devices or structures, including, without limitation, pins, screws, bearings, extensions, bumps, indentations, positioning features, and the like. Those skilled in the art will appreciate that the post collar 20, like the other elements of the post holder system 10, may be manufactured from any variety and combination of materials, including, without limitations, aluminum, steel, including stainless steel, various alloys, polymers, titanium, beryllium, tungsten, various metals, ceramics, elastomers, composite materials, magnetic materials and the like. For example, the holder body 14 may be manufactured from aluminum, while the mounting base 16 is manufactured from aluminum and includes one or more magnetic elements thereon to aid magnetically coupling the post holder 10 to a work surface 6.

Figure 22:
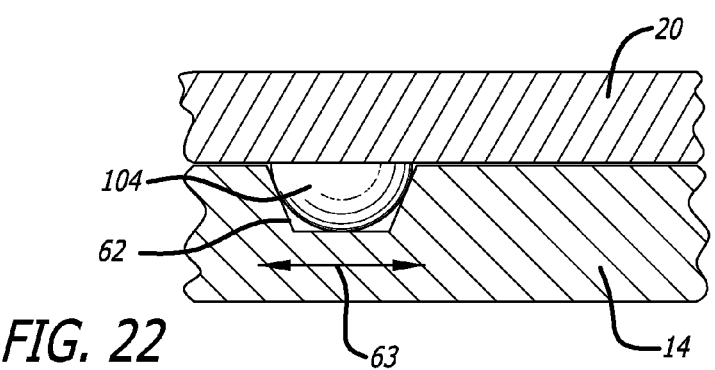
FIG. 22 is an enlarged elevation view, partially cut-away, of the collar positioning device engaged with a positioning element of the post holder.

The one collar positioning device 104 may be disposed on the lower side 29 of the post collar 20 and configured as a protrusion from a nominal lower surface of the post collar 20 to engage the at least one positioning element 62 of the post holder body 14. Although one collar positioning device 104 is shown in the illustrated embodiment, any suitable number of collar positioning devices 104 may be included, such as 1, 2, 3, 4, 5, 6, 7, 8, 9, 10, 11, 12 or more. These collar positioning devices 104 may be separated from each other by any suitable angular separation including a common angular separation up to 180 degrees. Other suitable common separation angles between the collar positioning devices may include 30°, 45° and 90°. Such an engagement may be arranged to mechanically capture an outside surface of a portion of the positioning device 104 within an inside surface of a positioning element 62 as shown in FIG. 22 (or vice versa). Such an arrangement may be used to prevent relative rotational movement about the post holder longitudinal axis 57 between the post collar assembly 20 and the post holder body 14 when the positioning element 62 and positioning device 104 are engaged. As such, the rotational position of an optical element secured to an optical mount 11 (which is in turn secured to an optical post 9) will be rotationally secured with respect to a work surface 6 so long as the mounting base 16 of the post mount system 10 is secured to the work surface 6 and the optical post is secured to the engaged collar assembly 20. This arrangement does, however, allow the post collar 20 to be easily disengaged from the collar coupling surface 60 by merely lifting the post collar 20 upward and axially away from the collar coupling surface 60. As shown in FIG. 22, the positioning device 104 makes contact with the positioning element in at least two locations which are disposed on opposite sides of the positioning device 104 in a circumferential orientation. The circumferential orientation being indicated in FIG. 22 by the arrow 63. Although the collar positioning device 104 is shown making contact with a bottom surface of the v-groove type positioning element 62 in FIG. 22, this is an optional configuration. The collar positioning device 104 need only contact the respective inside lateral surfaces of the v-groove type positioning element in order to mechanically capture the collar positioning device in the circumferential orientation indicated by arrow 63.

Figure 13:
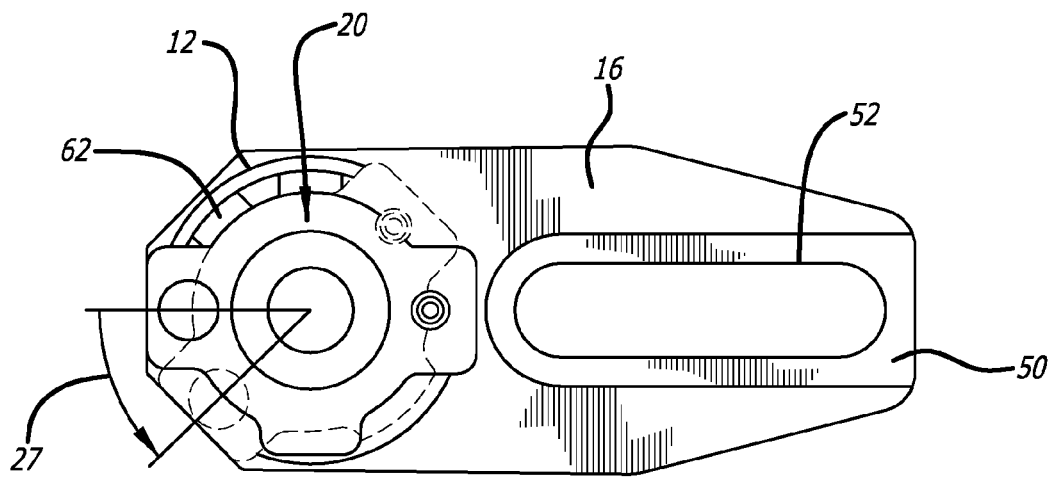
FIG. 13 is a top view of the post collar assembly of FIG. 9 coupled to the post holder of FIG. 4, with the post collar assembly depicted in two different angular engagement positions with respect to the post holder.

Referring to FIGS. 1, 5, and 13, the post collar assembly 20 may be releasably coupled and secured to the optical post 9 with the post lock device 94 at a desired location. Thereafter, the optical post 9 may be positioned within the post receiver 56 such that the positioning device 104 of the post collar 20 is engaging the positioning element 62 of the coupling surface 60. More specifically, at least one collar positioning device 104 positioned on the post collar 20 is made to engage at least one post positioning device 62 formed on the coupling surface 60 at a desired position and angular orientation. The positioning of the post collar assembly 20 is illustrated in FIG. 13. A first position of the post collar assembly 20 is indicated by the post collar figure drawn in solid lines, and a second position of the post collar assembly 20 is indicated by the post collar figure drawn with dashed lines. The magnitude of the angular displacement 27 between the first position and the second position of the post collar assembly (as measured about the post holder longitudinal axis 57) can be seen to be the same as the angular dimension 27 which is shown between the positioning elements 62 in FIG. 5. That is, the common angular separation between the positioning elements 62 shown in FIG. 5 is the same as the angular displacement of the post collar 20 as indicated by arrow 27 in FIG. 13.

As discussed above, the coupling between the lower side 20 of the post collar assembly 20 and the collar coupling surface 60 can be accomplished with any suitable configuration of positioning elements 62 or any suitable configuration of collar positioning devices 104. The embodiments shown in FIGS. 4-13 are configured such that the positioning elements 62 are v-groove type detents in the collar coupling surface 60 and the collar positioning device 104 is a spherical protrusion on the lower side 20 of the post collar assembly 20. That is to say that the positioning elements are 62 configured as inside surface features on the collar coupling surface 60 and the collar positioning device 104 is configured as an outside surface feature on the collar lower side 20. However, any suitable outside surface feature may be used for the configuration of the collar positioning device 104, including hemispherical protrusions, cylindrical protrusions, conical protrusions, or any other suitably profiled protrusion. It is important to note that the plurality of coupling features between the collar lower side 20 and the collar coupling surface 60 may be configured as inside surface features (detents, lumens, any suitable inside surface feature) on the collar lower side, and outside surface features (hemispherical protrusion, cylindrical protrusion, bump, any suitable outside surface feature) on the collar coupling surface 60.

Figure 14:
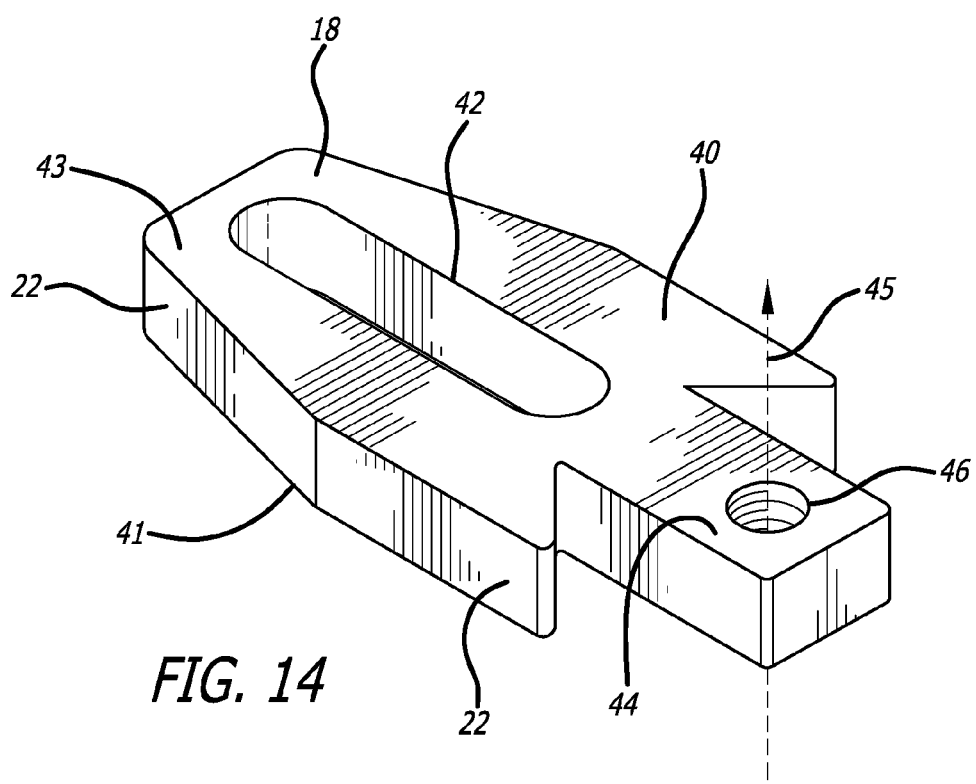
FIG. 14 is a perspective view of a mounting adapter showing a fastener recess and a positioner passage.
Figure 15:
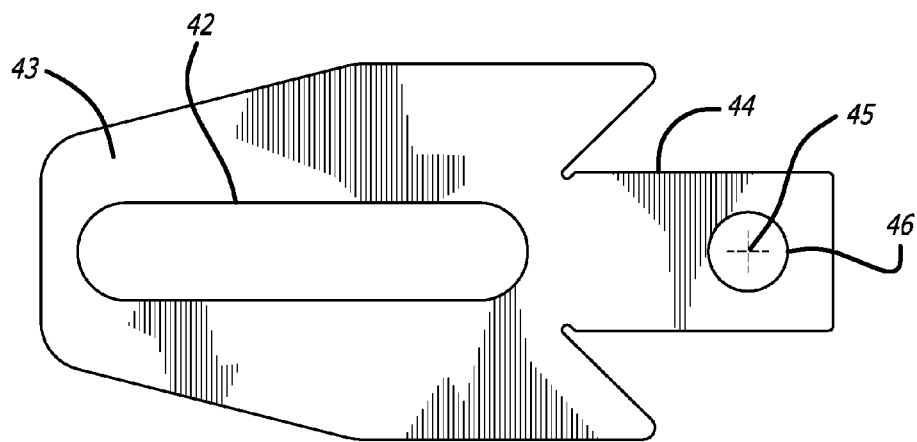
FIG. 15 is an elevation view of the mounting adapter of FIG. 14 showing the fastener recess and the positioner passage.

FIGS. 14 and 15 depict an embodiment of a mounting adapter 18 having an adapter body 40, a fastener receiver 42, a positioner passage 46, and a coupling extension 44. The mounting adapter 18 may act to provide additional stability to the optical mount assembly 8 when the mounting adapter 18 is coupled to the mounting base 16 of the optical post mount system 10. The mounting adapter 18 may have a flat adapter bottom surface 41 and an adapter top surface 43. The adapter body may include a positioner passage 46 disposed within the coupling extension 44. The positioner passage 46 may be configured as a threaded hole which extends from the adapter top surface 43 to the adapter bottom surface 41, with the axis of the positioner passage 46 being substantially perpendicular to the adapter bottom surface 41. The mounting adapter may also include a fastener receiver 42 which may be configured as an elongated transverse slot disposed such that it is substantially perpendicular to an axis 45 of the positioner passage 46.

Figure 18:
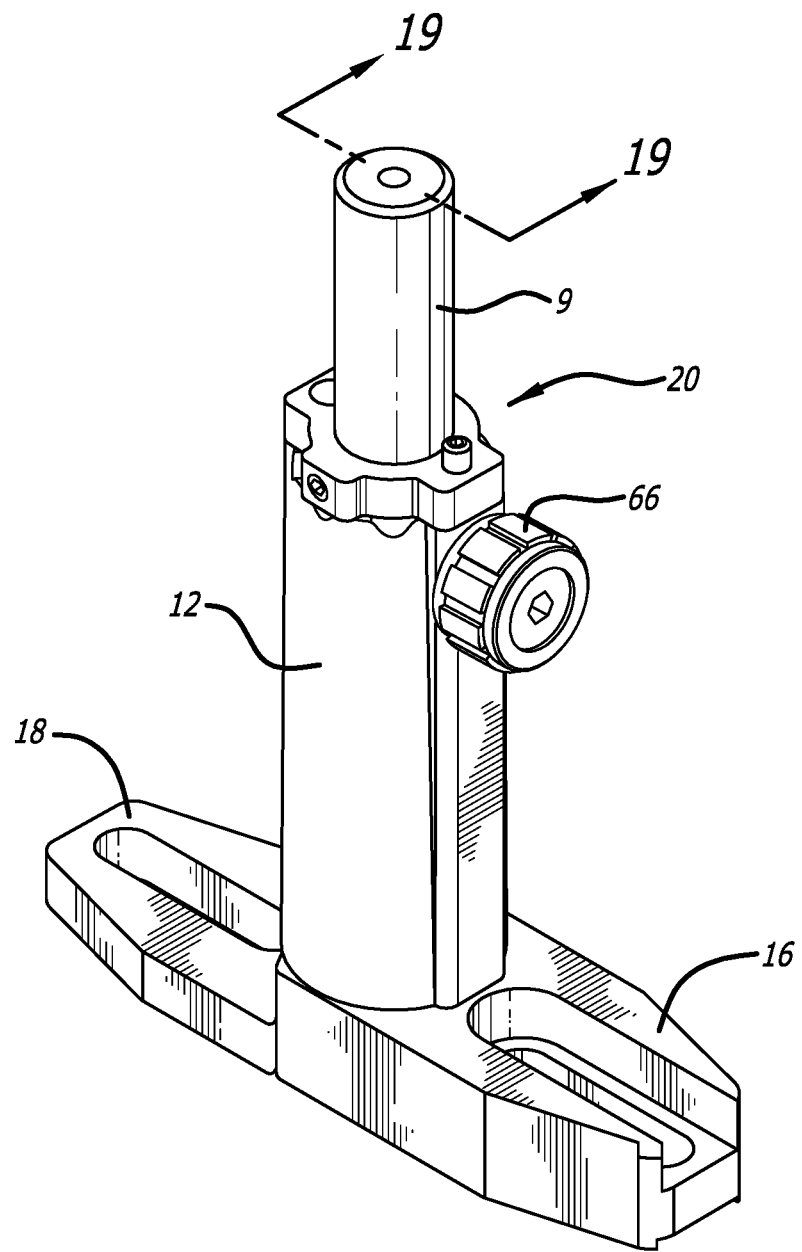
FIG. 18 is a perspective view of an optical post mount system including a post collar, a post holder, a mounting base, a mounting adapter, and a position lock device.

At least one mounting adapter 18 may be detachably coupled to at least one of the holder body 14 and/or the mounting base 16 as shown in FIG. 18. For some embodiments, the post holder 12 may include or be manufactured with multiple mounting bases 16 non-detachably coupled to the holder body 14, thereby eliminating the mounting adapter 18. For some embodiments, the post holder 12 may include or be manufactured with multiple mounting adapters 18 detachably coupled to the holder body 14, thereby eliminating the mounting base 16. During use, the mounting adapter 18 may be used to securely position the post holder body 14 on the work surface 6 while offering improved linear stiffness, angular stiffness, and control rotation and tip/tilt deflection. This allows for a user to position the optical post mount system 10 on the work surface 6 with multiple fasteners 7.

As shown in FIGS. 3C and 3D, the post holder 12 may include at least one mounting adapter receiver 30 formed thereon. In the embodiment shown in FIGS. 6 and 7, the mounting adapter receiver 30 is formed on the mounting base 16 of the holder body 14. Those skilled in the art will appreciate that any number of mounting adapter receivers 30 may be formed at any variety of locations on the post holder 12. Optionally, the post holder 12 may be manufactured without a mounting adapter receiver 30 formed thereon. For some embodiments, the adapter receiver 30 may include one or more magnetic device positioned therein thereby permitting the post holder 10 to be magnetically coupled to a work surface, thereby eliminating the need for fasteners to coupled the post holder 14 to a work surface.

Figure 19:
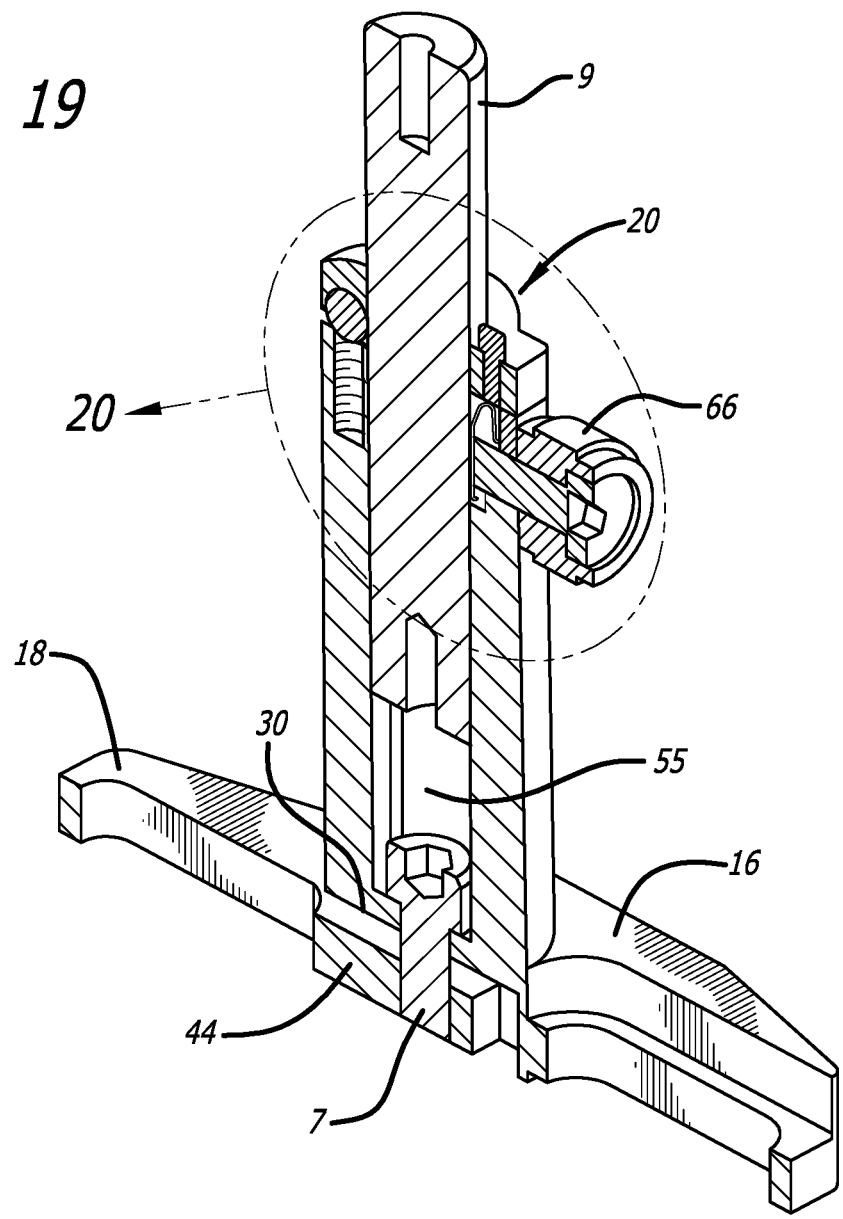
FIG. 19 is a perspective view in section of the optical post mount system of FIG. 18 showing an optical post disposed in the post receiver in section.

As shown in FIGS. 14 and 15, the mounting adapter 18 includes an adapter body 40 defining at least one fastener receiver 42 therein. Further, at least one coupling extension 44 extends from the adapter body 40. As shown in FIG. 19 at least a portion of the coupling extension 44 may be inserted into the adapter receiver 30 formed on the post holder 12. The coupling extension 44 may include one or more positioner passages 46 formed therein. The mounting adapter may be secured to the post holder 12 as shown in FIG. 19. The coupling extension 44 of the mounting adapter may be inserted into the adapter receiver 30 of the post holder 12. For some embodiments, the adapter receiver 30 includes an elongate open slot open on the bottom side. The elongate slot being formed in the bottom surface of the mounting base 16. The coupling extension 44 may include an elongate protrusion which extends laterally from the mounting adapter 18 and may have an outer profile that is shaped and configured to closely engage an inner surface or profile at the elongate open slot of the adapter receiver 30. Such an arrangement may be useful in allowing the coupling extension 44 to easily slide in and out of the elongate slot of the adapter receiver 30 while still maintaining lateral stability between the mounting base 16 and mounting adapter 18 when engaged. A fastener 7 may then be inserted through the post receiver 56 (this could be done prior to the insertion of the optical post 9 into the post receiver 56). The fastener could then be secured into the positioner passage 46 thereby securing the mounting adapter 18 to the post holder 12.

For some method embodiments, an alignment pin 70 may be coupled to a work surface 6 such as an optical table. Thereafter, the mounting adapter 18 may be positioned proximate to the alignment pin 70 such that the alignment pin 70 extends through the positioner passage 46 formed on the coupling extension 44 formed on the adapter body 40. A fastener 7 may be inserted through the fastener receiver 42 formed on the adapter body 40 and secured to the work surface 6, thereby coupling the mounting adapter 18 to the work surface 6. The holder body 14 may then be placed on the work surface 6 such that the coupling extension 44 is located with the adapter receiver 30 formed on the mounting base 16 of the holder body 14. Further, the alignment pin 70 may be inserted into the positioner receiver 32 formed in the holder body 14. Finally, a fastener 7 may be inserted through fastener orifice 52 formed in the fastener recess 50 on the mounting base 16 of the holder body 14 and secured to the work surface 6, thereby securely coupling the post holder 12 to the work surface 6 using multiple coupling points.

Optionally, the post holder 12 can be similarly coupled to the work surface 6 without using the mounting adapter 18. As such, the post holder 12 may be coupled to a work surface 6 using a fastener 7 positioned within the fastener orifice 52 formed in the fastener recess 50 on the mounting base 16 of the holder body 14. Further, the use of an alignment pin 70 secured to the work surface 6 and the positioner receiver 32 and/or positioner orifice 46 enables the user to easily and repeatedly remove and re-couple the post holder 12 to the work surface 6 in substantially the same location.

For some embodiments the positioner receiver 32 formed on the holder body 14 may be in communication with the post receiver 56. During use, a user may position a fastener 7 in the positioner receiver 32 via the post receiver 56. The fastener 7 may comprise a threaded device such as a screw which is configured to engage and be retained within the positioner orifice 46 formed on the coupling extension 44 and a work surface hole 15 formed on the work surface 6. For some embodiments, the post holder body 14 may be coupled to the mounting adapter 18 with a fastener 7 positioned within the post receiver 56. Similarly, the mounting adapter 18 may be coupled to the work surface 6 via at least one fastener 7 positioned within the fastener receiver 42 formed on the mounting adapter 18. In addition, the holder body 14 is also coupled to the work surface 6 via another fastener 7 positioned within the fastener orifice 52 formed in the fastener recess 50 of the holder body 14.

Figure 16:
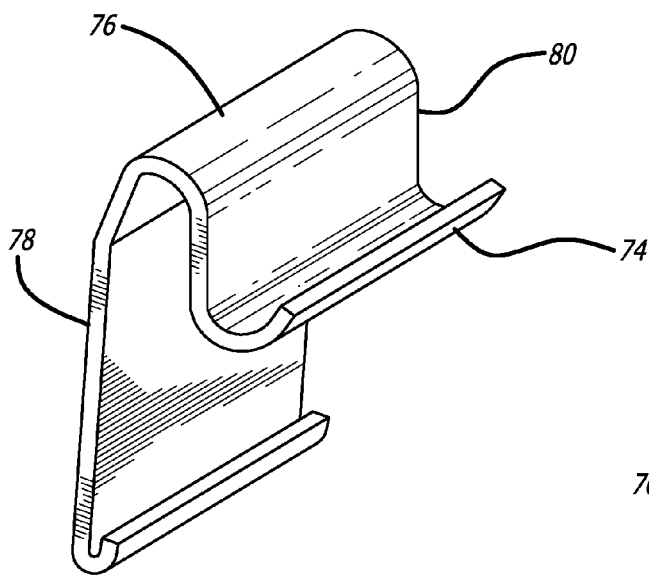
FIG. 16 is a perspective view of a biasing member.
Figure 17:
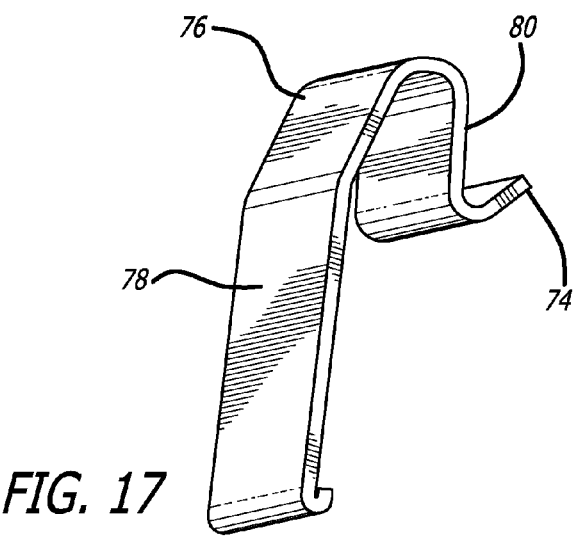
FIG. 17 is a perspective view of the biasing member.
Figure 20:
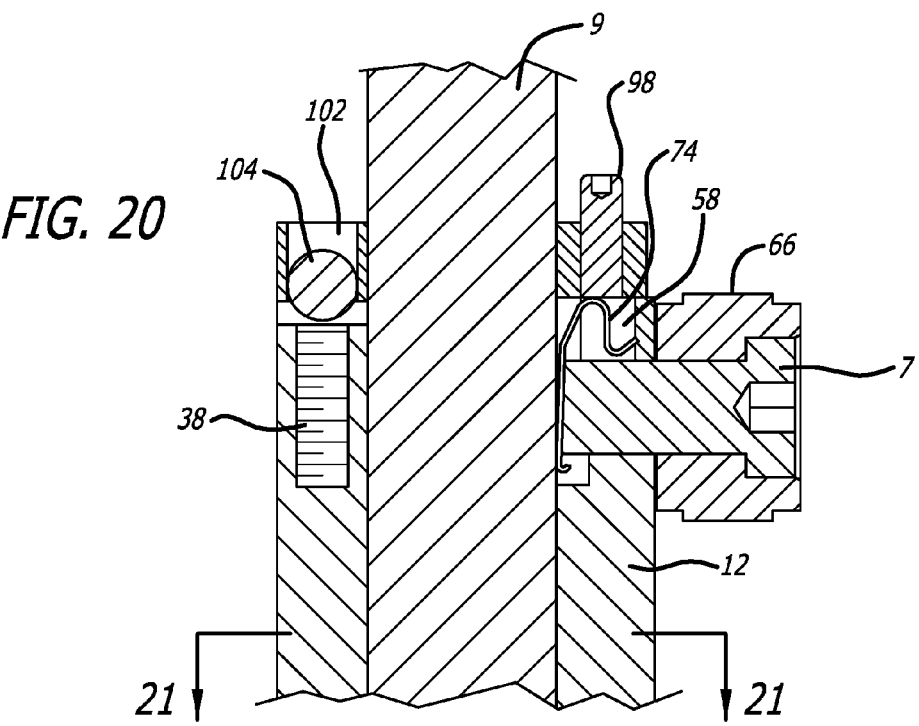
FIG. 20 is an enlarged elevation view of the optical post mount system of FIG. 18 showing the optical post disposed in the post receiver and engaged by the biasing member.
Figure 21:
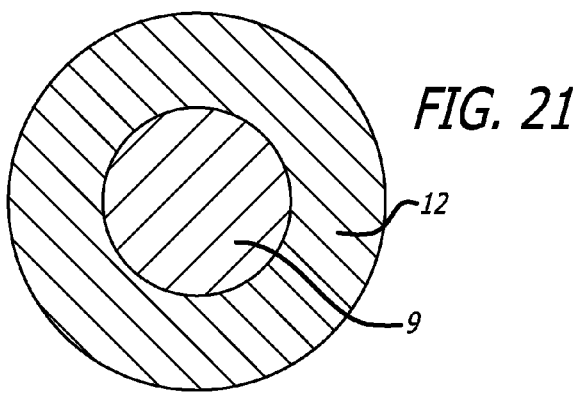
FIG. 21 is a transverse cross section view of the post holder and optional post of FIG. 20 taken along lines 21-21 of FIG. 20.

The optical post mount system 10 may include at least one biasing member 74 which is shown in FIG. 16. The biasing member is shown disposed into the biasing member receiver 58 in FIG. 20. The biasing member receiver 58 may be configured to securely couple to and retain and least one biasing member 74 therein, and may be formed in or otherwise coupled to the holder body 14. For some embodiments, at least a portion of a biasing member 74 may extend into the elongate bore of the post receiver 56. As shown in FIG. 16, the biasing member 74 comprises a resilient spring-like biasing device body 76 having at least one engaging surface 78 formed thereon. In addition, the biasing device body 76 may include a coupling feature or element 80 configured to engage the biasing device receiver 58 formed on the holder body 14 and be securely retained therein. In the illustrated embodiment, the biasing member 74 comprises a single device. Optionally, the biasing member 74 may comprise multiple elements or bodies. During use, the biasing member 74 is configured to apply a resilient spring-like biasing force to an outside surface of the optical post 9 positioned within the post receiver 56 as shown in FIG. 20. More specifically, the engaging surface 78 is configured to contact the optical post 9 positioned within the post receiver 56 and provide sufficient surface friction between an outside surface of the optical post 9 and the contact surface of the biasing member 74 so as to overcome the weight or gravitational force on the optical post 9 and any accessories attached thereto. The frictional force generated by the biasing member 74 should also be small enough to allow a user to overcome the frictional force by manual manipulation thereby allowing the user to reposition the optical post 9 within the post receiver 56 by applying manual force to the optical post 9. Thereafter, if the user releases the optical post 9, it will remain stationary due to the resilient frictional force impose on it by the biasing member 74. Because various optical posts 9 and associated accessories may vary in weight, different biasing members 75 having different thicknesses and spring forces may be used to match the weight of a given optical post 9/accessory combination. For some embodiments, the biasing member 74 may be manufactured from spring steel, polymer material, or any other suitable resilient spring-like material. Those skilled in the art will appreciate that the biasing device 74 may be manufactured from any variety of materials. For example, for some embodiments, the engaging surface 78 may include at least one magnetic material thereon. Optionally, the novel post holder system 10 disclosed herein may be manufactured without the biasing member 74. For some embodiments, the clearance between an outer surface 33 of the optical post 9 and the inner surface of the elongated cylindrical bore 56 or post receiver may be from about 0.01 mm to about 0.5 mm.

As shown in FIGS. 18-20, the post holder system 10 may include at least one position lock device 66. In the illustrated embodiment, the lock device 66 is positioned within at least one lock device recess 64 formed on the holder body 14 proximate to the biasing member 74. During use, an optical post 9 is positioned within the post receiver 56 at a desired height. The biasing member 74 applies a biasing force to the optical post 9 thereby allowing the user to retain the optical post at a desired location. Thereafter, the user may actuate the lock device 66 which applies a locking force to the optical post within the post receiver 56 so as to more securely fix the optical post 9 to the holder body 14. In the embodiment shown in FIGS. 1-3, 18, 19 and 20 the lock device 66 applies the locking force to the optical post via the engaging surface 78 formed on the biasing member 74. For some embodiments, the lock device 66 includes a threaded body configured to extend into and retract from the post receiver 56 when actuated by the user. As such, the lock device receiver 64 may similarly comprise a threaded orifice configured to retain the lock device 66 therein. Those skilled in the art will appreciate that any variety of lock devices 74 may be used with the novel optical post holder system 10.

During use of the optical mount assembly 8, the fine adjustment device 98 on the post collar 20 may be actuated to finely position the height of the optical post supporting the optical element. Once the desired position is attained, the user may actuate the lock device 66 to secure the optical post 9 within the post holder system 10. Thereafter, the user may disengage the lock device 66 and remove the optical post from the post holder system 10, and know that the optical element can be easily and repeatably positioned at the previous location per the engagement of the positioning elements 62 and positioning devices 109 discussed above.

During use, a user may couple an optical element 11 to an optical post 9. Thereafter, the user may couple an alignment pin 70 to a work surface 6 such as an optical table. The user may position the mounting adapter 18 on the work surface 6 such that the alignment pin 70 extends through the positioner orifice 46 formed on the coupling extension 44 of the mounting adapter 18. The mounting adapter 18 may then be securely coupled to the work surface 6 with at least one fastener 7 positioned within the fastener receiver 42 formed on the mounting adapter 18. Thereafter, the post holder 12 may be positioned on the work surface 6 such that the alignment pin 70 is positioned within the positioner recess 32 formed on the mounting base 16. A fastener 7 may be positioned within the fastener recess 52 formed on the mounting base 16 to couple the holder body 14 to the work surface.

Figure 23:
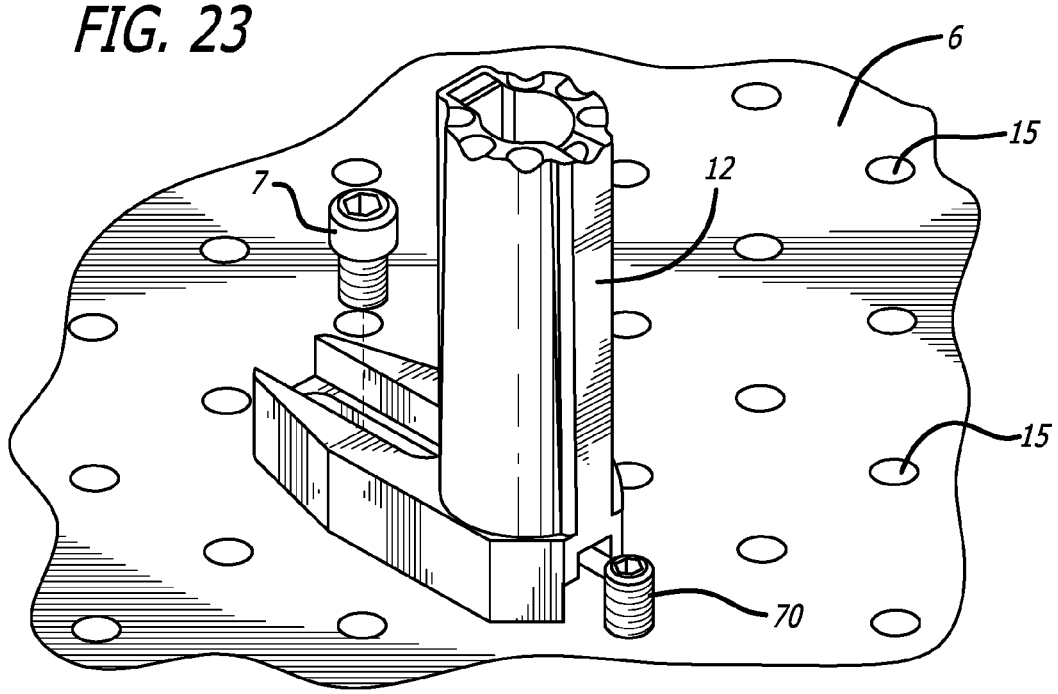
FIG. 23 is a perspective view of a post holder, a fastener, a work surface, and an alignment pin secured to the work surface.
Figure 24:
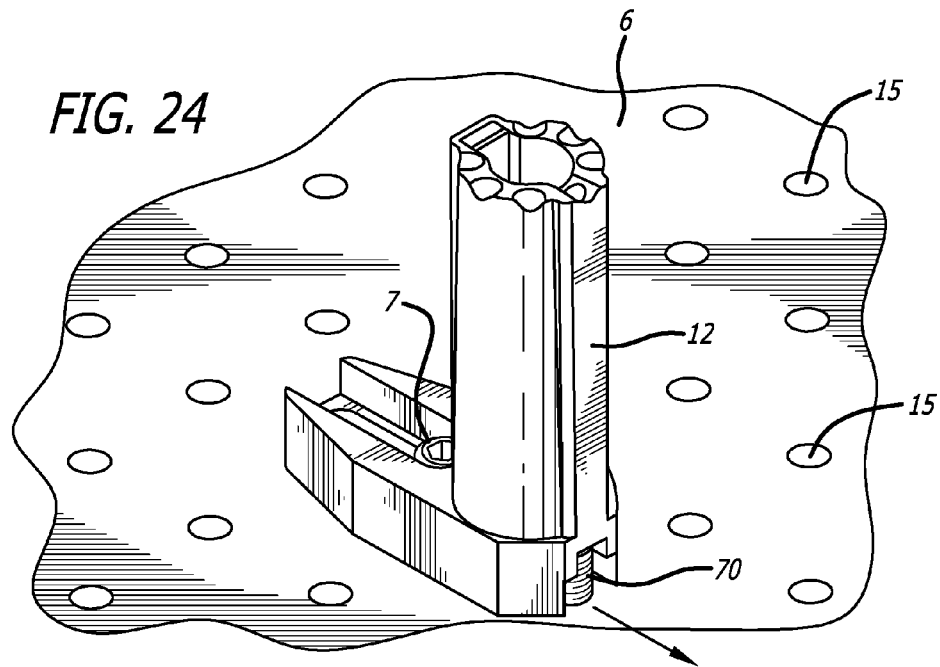
FIG. 24 is a perspective view of the post holder of FIG. 23 with the fastener partially secured to the work surface and an alignment slot of the post holder sliding over the alignment pin which is secured to the work surface.
Figure 25:
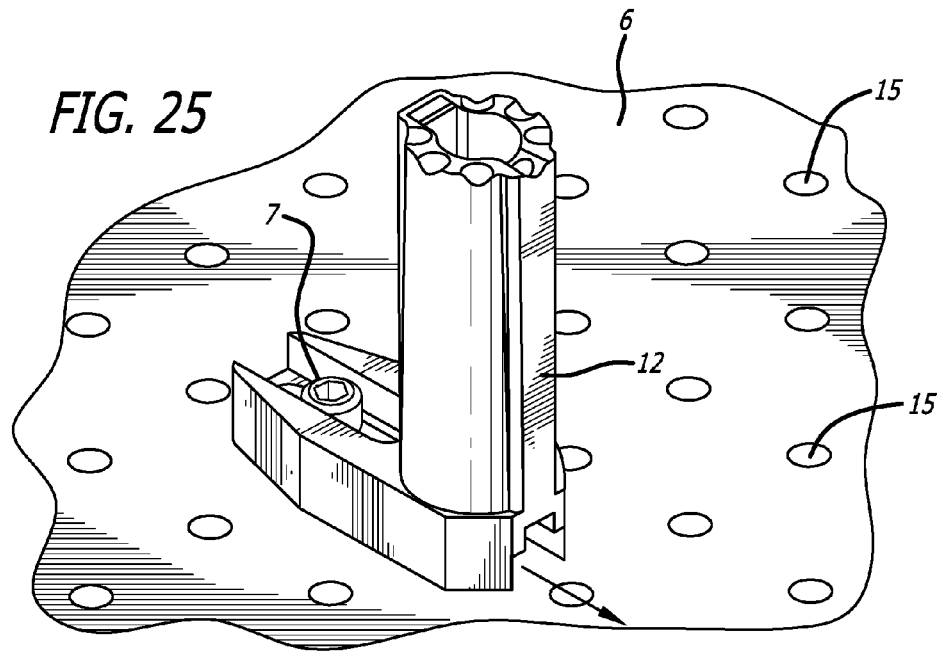
FIG. 25 is a perspective view of the post holder of FIG. 23 with the fastener partially secured to the work surface and an alignment slot of the post holder sliding over the alignment pin which is secured to the work surface.

The alignment slot 24 of the post holder 12 may be used in order to position the post holder 12 when the mounting adapter 18 is not used in conjunction with the post holder 12. FIGS. 23-25 show the post holder 12, the work surface 6, and an alignment pin 70. FIG. 23 depicts a fastener 7 being inserted into the fastener orifice 53 of the post holder 12 and into a work surface hole 15 of the work surface 6. Also shown is the alignment pin 70 which is disposed in another work surface hole 15. FIG. 24 depicts the fastener 7 disposed through the fastener orifice 15 and partially inserted (not tightened) into the work surface hole 15. The post holder 12 can now be slid along the work surface 6 in a direction which is substantially parallel to the alignment slot 24 as shown in FIG. 25. As the post holder 12 is slid along the work surface 6, the alignment pin 70 constrains the motion of the post holder 12 to one degree of freedom which is parallel to the direction of the alignment slot 24. When the post holder 12 is thus properly positioned, a user may then fully secure the fastener 7 to the work surface 6 and lock the post holder 12 into position.

The configuration of the optical mount assembly 8 also facilitates the exchange of multiple optical mounts 11 (and any optical element disposed within the optical device receptacle 13 of the optical mount 11 or the like) which are coupled to respective multiple optical posts 9 and respective post collar assemblies 20 into and out of the optical post mount system 10. For such a method, a first optical post 9, first optical mount 11, and first post collar assembly 20 may be removed from the post mount system 10 by disengaging the post collar assembly 20 from the collar coupling surface 60 such that the collar positioning device 104 is disengaged from at least one of the positioning elements 62 and no longer prevents relative rotational movement of the post collar assembly 20 about the post holder longitudinal axis 57. A user may then couple a second post collar assembly, a second optical post and a second optical mount to the optical post mount system 10 such that the second post collar engages the collar coupling surface 60 and such that a second collar positioning device 104 of the second post collar 20 is engaged with at least one positioning element 62 of the collar coupling surface 60. Such engagement thereby prevents the relative rotational movement in a circumferential orientation 63 of the second post collar assembly about the post holder longitudinal axis 57. The method of replacing an optical mount 11 of the optical mount assembly 8 can be continued indefinitely, that is the second post collar assembly, the second optical post, and the second optical mount can be replaced by a third post collar assembly, a third optical mount, a third optical post or by the first assembly and so on. In addition, any of the post collar, optical post and optional optical mount assemblies, including the first assembly and second assembly discussed above, with respect to the exchange or replacement thereof, may have any of the features, dimensions or materials of any of the corresponding embodiments discussed herein.

With regard to the above detailed description, like reference numerals used therein may refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

The entirety of each patent, patent application, publication and document referenced herein is hereby incorporated by reference. Citation of the above patents, patent applications, publications and documents is not an admission that any of the foregoing is pertinent prior art, nor does it constitute any admission as to the contents or date of these documents.

Modifications may be made to the foregoing embodiments without departing from the basic aspects of the technology. Although the technology may have been described in substantial detail with reference to one or more specific embodiments, changes may be made to the embodiments specifically disclosed in this application, yet these modifications and improvements are within the scope and spirit of the technology. The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" may refer to one of or a plurality of the elements it modifies (e.g., "a reagent" can mean one or more reagents) unless it is contextually clear either one of the elements or more than one of the elements is described. Although the present technology has been specifically disclosed by representative embodiments and optional features, modification and variation of the concepts herein disclosed may be made, and such modifications and variations may be considered within the scope of this technology.

Certain embodiments of the technology are set forth in the claim(s) that follow(s).

What is claimed is:

1. An optical mount assembly, comprising:
an optical post mount system, including:
a post holder body;
a mounting base disposed at a lower end of the post holder body in fixed relation thereto, the mounting base comprising a flat bottom surface and an adapter receiver therein;
a mounting adapter including a flat bottom surface and a coupling extension which is configured to be detachably coupled to the mounting base with the coupling extension engaged with the adapter receiver and with the flat bottom surface of the mounting adapter being parallel to the flat bottom surface of the mounting base; and
wherein the adapter receiver comprises an elongate open slot in the bottom surface of the mounting base and the coupling extension comprises an elongate protrusion which extends from the mounting adapter and which has an outer profile that is configured to closely engage an inner surface of the elongate open slot of the adapter receiver.

2. The optical mount assembly of claim 1 wherein the coupling extension further comprises a positioner passage which is configured to accept a fastening element to secure the mounting adapter.

3. The optical mount assembly of claim 2 wherein the positioner passage comprises a threaded hole which has a longitudinal axis that is substantially perpendicular to the bottom surface of the mounting adapter.

4. An optical mount assembly, comprising:
an optical post mount system, including:
a post holder body;
a mounting base disposed at a lower end of the post holder body in fixed relation thereto, the mounting base comprising a flat bottom surface and an adapter receiver therein;
a mounting adapter including a flat bottom surface and a coupling extension which is configured to be detachably coupled to the mounting base with the coupling extension engaged with the adapter receiver and with the flat bottom surface of the mounting adapter being parallel to the flat bottom surface of the mounting base; and wherein the mounting base comprises a fastener orifice which includes an elongate slot which is substantially perpendicular to the bottom surface of the mounting base and which extends radially from a longitudinal axis of a post receiver bore.

5. An optical mount assembly, comprising:
an optical post mount system, including:
 a post holder body;
 a mounting base disposed at a lower end of the post holder body in fixed relation thereto, the mounting base comprising a flat bottom surface and an adapter receiver therein;
 a mounting adapter including a flat bottom surface and a coupling extension which is configured to be detachably coupled to the mounting base with the coupling extension engaged with the adapter receiver and with the flat bottom surface of the mounting adapter being parallel to the flat bottom surface of the mounting base; and
 wherein the mounting base further comprises an alignment slot which is adjacent the adapter receiver and which is configured to engage an alignment pin which is secured to a work surface.

6. An optical mount assembly, comprising:
an optical post mount system, including:
 a post holder body including a rigid structure, an upper end, a lower end, and a post receiver,
 a mounting base disposed at the lower end of the post holder body in fixed relation thereto, the mounting base including a rigid structure, a flat bottom surface and an adapter receiver disposed therein,
 a mounting adapter including a rigid structure, a flat bottom surface and a coupling extension which is configured to be detachably coupled to the adapter receiver and with the flat bottom surface of the mounting adapter being parallel to the flat bottom surface of the mounting base;
 a rigid elongate optical post operatively coupled with the post receiver of the post holder body, the optical post including an upper end and a lower end;
 an optical mount secured to the upper end of the optical post; and wherein the adapter receiver comprises an elongate open slot in the flat bottom surface of the mounting base and the coupling extension comprises an elongate protrusion which extends from the mounting adapter and which has an outer surface profile that is configured to closely engage an inner surface profile of the elongate open slot of the adapter receiver.

7. The optical mount assembly of claim 6 wherein the coupling extension further comprises a positioner passage which is configured to accept a fastening element to secure the mounting adapter.

8. The optical mount assembly of claim 7 wherein the positioner passage comprises a threaded hole which has a longitudinal axis that is substantially perpendicular to the flat bottom surface of the mounting adapter.

9. An optical mount assembly, comprising:
an optical post mount system, including:
 a post holder body including a rigid structure, an upper end, a lower end, and a post receiver,
 a mounting base disposed at the lower end of the post holder body in fixed relation thereto, the mounting base including a rigid structure, a flat bottom surface and an adapter receiver disposed therein,
 a mounting adapter including a rigid structure, a flat bottom surface and a coupling extension which is configured to be detachably coupled to the adapter receiver and with the flat bottom surface of the mounting adapter being parallel to the flat bottom surface of the mounting base;
 a rigid elongate optical post operatively coupled with the post receiver of the post holder body, the optical post including an upper end and a lower end;
 an optical mount secured to the upper end of the optical post; and
 wherein the mounting base comprises a fastener orifice including an elongate slot which is configured to accept fasteners that are aligned perpendicular to the flat bottom surface of the mounting base and which has a longitudinal axis that extends radially from a longitudinal axis of an elongate cylindrical bore of the post receiver.

10. The optical mount assembly of claim 9 wherein the mounting base comprises at least one alignment face which includes a flat surface which is disposed on an outside surface of the mounting base, which is perpendicular to the flat bottom surface of the mounting base and which is disposed at a predetermined angle with respect to a longitudinal axis of the elongate slot of the fastener orifice of the mounting base.

11. The optical mount assembly of claim 10 wherein the mounting base comprises a plurality of alignment faces disposed at predetermined angles with respect to the longitudinal axis of the elongate slot selected from the group consisting of 30 degrees, 45 degrees and 90 degrees.

12. The optical mount assembly of claim 9 wherein the mounting base further comprises an alignment slot which is adjacent the adapter receiver, which is configured to engage an alignment pin which is secured to and extends upwardly from a work surface and which has a longitudinal axis which is substantially parallel to the longitudinal axis of the elongate slot of the fastener orifice.

13. An optical mount assembly, comprising:
an optical post mount system, including:
 a post holder body including a rigid structure, an upper end, a lower end, and a post receiver,
 a mounting base disposed at the lower end of the post holder body in fixed relation thereto, the mounting base including a rigid structure, a flat bottom surface and an adapter receiver disposed therein,
 a mounting adapter including a rigid structure, a flat bottom surface and a coupling extension which is configured to be detachably coupled to the adapter receiver and with the flat bottom surface of the mounting adapter being parallel to the flat bottom surface of the mounting base;
 a rigid elongate optical post operatively coupled with the post receiver of the post holder body, the optical post including an upper end and a lower end;
 an optical mount secured to the upper end of the optical post; and wherein the mounting base further comprises an alignment slot which is adjacent the adapter receiver and which is configured to engage an alignment pin which is secured to and extends upwardly from a work surface.

* * * * *